(12) United States Patent
Bigos

(10) Patent No.: US 12,347,022 B2
(45) Date of Patent: Jul. 1, 2025

(54) METHOD AND SYSTEM FOR GENERATING A TARGET IMAGE FROM PLURAL MULTI-PLANE IMAGES

(71) Applicant: Sony Interactive Entertainment Europe Limited, London (GB)

(72) Inventor: Andrew James Bigos, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 129 days.

(21) Appl. No.: 18/017,793

(22) PCT Filed: Jul. 23, 2021

(86) PCT No.: PCT/GB2021/051906
§ 371 (c)(1),
(2) Date: Jan. 24, 2023

(87) PCT Pub. No.: WO2022/018454
PCT Pub. Date: Jan. 27, 2022

(65) Prior Publication Data
US 2023/0281912 A1    Sep. 7, 2023

(30) Foreign Application Priority Data

Jul. 24, 2020 (GB) .................................. 2011546

(51) Int. Cl.
*G06T 15/20* (2011.01)
*G06T 15/06* (2011.01)
(Continued)

(52) U.S. Cl.
CPC .............. *G06T 15/20* (2013.01); *G06T 15/06* (2013.01); *G06T 15/30* (2013.01); *G06T 15/503* (2013.01)

(58) Field of Classification Search
CPC ......... G06T 15/20; G06T 15/06; G06T 15/30; G06T 15/503; H04N 13/275; H04N 13/257; G06V 10/7715
See application file for complete search history.

(56) References Cited

U.S. PATENT DOCUMENTS 10,142,561 B2 * 11/2018 Reynolds
2020/0137380 A1 * 4/2020 Supikov .................. G06N 3/063

OTHER PUBLICATIONS

Zhou et al., Stereo Magnification: Learning view synthesis using multiplane images, ACM Trans. Graph., vol. 37, No. 4, Article 65. Publication date: Aug. 2018. (Year: 2018).*

(Continued)

*Primary Examiner* — Kee M Tung
*Assistant Examiner* — Biao Chen
(74) *Attorney, Agent, or Firm* — Fish & Richardson P.C.

(57) ABSTRACT

A method of generating an image of a scene from a target viewpoint is provided. The method comprises capturing a plurality of multi-plane images of a virtual scene, and determining for each multi-plane image, whether a frontmost clipping plane pair defined for that multi-plane image intersects a virtual object in the virtual scene. Responsive to a positive determination for a respective clipping plane pair, the corresponding image data in the corresponding image plane is identified and assigned an identifier, thus generating a modified version of the corresponding multi-plane image. Camera information is obtained for the one or more virtual cameras that captured the multi-plane images and the target virtual camera. An output image is then generated by combining at least one of the modified multi-plane images with another of the multi-plane images in accordance with the obtained camera information. A corresponding system is also provided.

25 Claims, 15 Drawing Sheets

(51) Int. Cl.
    *G06T 15/30*     (2011.01)
    *G06T 15/50*     (2011.01)

(56) References Cited

OTHER PUBLICATIONS

International Search Report and Written Opinion for International Application No. PCT/GB2021/051906, issued from the European Patent Office on Nov. 4, 2021.
Search Report issued in connection with the GB Application No. 2011546.5 on Apr. 16, 2021, from the European Patent Office.
Dai Peng et al: "Neural Point Cloud Rendering via Multi-Plane Projection", 2020 IEEE/CVF Conference on Computer Vision and Pattern Recognition (CVPR), IEEE, Jun. 13, 2020.
Srinivasan Pratul P et al: "Pushing the Boundaries of View Extrapolation With Multiplane Images", 2019 IEEE/CVF Conference on Computer Vision and Pattern Recognition (CVPR), IEEE, Jun. 15, 2019.
Tinghui Zhou et al: "Stereo Magnification: Learning View Synthesis using Multiplane Images", arxiv.org, Cornell University Library, 201 Olin Library Cornell University Ithaca, NY 14853, May 24, 2018.
Tucker Richard et al: "Single-View View Synthesis With Multiplane Images", 2020 IEEE/CVF Conference on Computer Vision and Pattern Recognition (CVPR), IEEE, Jun. 13, 2020.

\* cited by examiner

METHOD AND SYSTEM FOR GENERATING A TARGET IMAGE FROM PLURAL MULTI-PLANE IMAGES

CROSS-REFERENCE TO RELATED APPLICATIONS

The present application is the U.S. National Stage application of International Application No. PCT/GB2021/051906, filed Jul. 23, 2021, which International Application was published on Jan. 27, 2022, as International Publication No. WO2022/018454. The International Application claims priority to British Patent Application No. 2011546.5 filed Jul. 24, 2020, the contents of which are incorporated herein by reference in their entireties.

TECHNICAL FIELD

The present disclosure relates to a method and system for generating an output image of a virtual scene from a plurality of multi-plane images.

BACKGROUND

It is known in the art that multi-plane images (MPIs) can be used to generate an image of a scene from a target viewpoint.

Conventionally, an MPI represents a scene as a set of RGB-α planes within a reference view frustum. The reference view frustum is typically split up into a plurality of depth segments, with each depth segment being defined by a respective pair of clipping planes that divides the reference view frustum into that depth segment.

In an MPI, each RGB-α plane corresponds to a two-dimensional projection of the portion of the scene within a respective successive depth segment. That is, each RGB-α plane corresponds to a respective RGB image split by depth range. The 'a' value for a given RGB-α plane represents the pixel coverage for the pixels in that plane and determines how those pixels are to be combined with pixels in the other image planes. Typically, RGB-α planes are blended from back to front using an alpha blend 'OVER' operator such that objects in the foreground appear in front of objects in the background.

By combining multiple MPIs together, it is possible to generate an image of a scene from a target viewpoint that does not correspond to any of the reference viewpoints for which the MPIs were captured. An example of such a technique is described in 'Stereo Magnification: Learning view synthesis using multiplane images', T. Zhou, 65:1-65:12 (people.eecs.berkeley.edu/~tinghuiz/papers/siggraph18_mpi_lowres.pdf).

Currently, MPIs are largely used to synthesize new viewpoints from real photographic data. However, a number of opportunities exist for rendering such viewpoints for synthetic (i.e. virtual) scenes, such as those rendered as part of a video game. With these opportunities, new problems arise. The present disclosure is concerned with at least some of these problems; in particular, the problem of handling occlusions and disocclusions in synthesized images.

SUMMARY

The present disclosure is defined by the appended claims.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

As mentioned previously, it is possible to render an image of a scene from a target viewpoint by combining a plurality of reference MPIs together, each reference MPI being captured from a different respective reference viewpoint.

Figure 1:
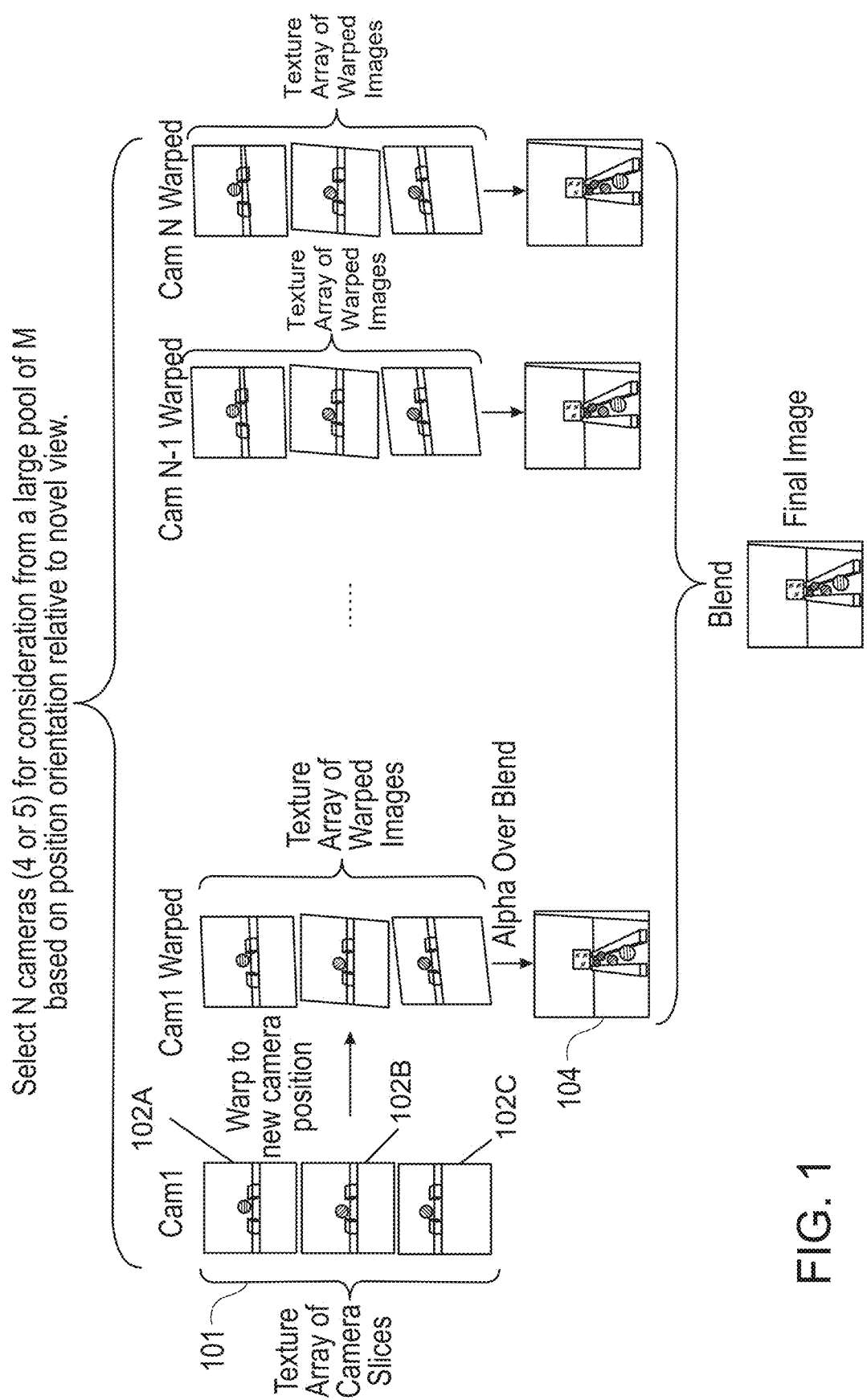
FIG. 1 shows schematically an example of an MPI rendering process.

FIG. 1 shows schematically an example of a conventional MPI rendering process. In FIG. 1, N virtual cameras are selected from a larger pool of M cameras for generating an image of a virtual scene from a target viewpoint. The value of N may be, for example, 4 or 5, but is generally dependent on the number of cameras determined as having sufficiently similar viewpoints to that of the target viewpoint. The target viewpoint corresponds to a viewpoint of the virtual scene for which an image of the scene is desired but for which there is no exact corresponding image.

For each virtual camera in the virtual scene, an MPI is obtained that captures the view from that camera as a number of images split by depth range. In FIG. 1, a first MPI 101, captured by a first virtual camera ('Cam1') is shown as comprising three image planes 102A, 102B, 102C. It will be appreciated that FIG. 1 is just an illustrative example and that in reality, the MPI may comprise more image planes than this. For example, there may be a further image plane representing e.g. a back wall of the scene (not shown).

In FIG. 1, there are N virtual cameras and so N corresponding MPIs. For the selected N virtual cameras, the individual image planes within each corresponding MPI are warped based on the difference in viewpoint between the virtual camera that captured that MPI (the reference viewpoint) and the target viewpoint. The viewpoints for each camera may be defined in terms of camera extrinsics and intrinsics, for example.

In FIG. 1, the warping of each image plane in the first MPI 101 is shown as resulting in the generation of a texture array of warped images (labelled as 'Cam1Warped'). This warping is repeated for the image planes in each MPI, as indicated by the set of warped images generated for 'CamN-1Warped' and 'CamNWarped'.

Following the warping of the images in a respective MPI, the warped images are then composited together to make a single image. This is performed for each set of warped images, resulting in N composite images-one for each of the MPIs. In FIG. 1, the blending of the warped image planes is shown for 'Cam1' up to 'CamN-1' and 'CamN'. It will be appreciated that there may be further sets of warped images between and up to 'CamN-1' and 'CamN'.

As shown in FIG. 1, for a given set of warped images, an 'Alpha Over Blend' operation is performed so as to form a composite image from the warped images. Generally, this involves blending the image planes (for a given set) from back to front, such that pixels corresponding to foreground objects are shown in favour of pixels corresponding to background objects.

The N composite images are then blended together using a further blending operation so as to form a final output image. In FIG. 1, this operation is referred to as a 'Blend' operation. The warped MPIs are blended together in accordance with a blending equation, wherein warped MPIs corresponding more closely with the target viewpoint are assigned a higher weighting compared with the other warped MPIs. This ensures that the contribution of colour information from higher weighted MPIs is greater in the final output image. Generally, the more dissimilar the viewpoint of a given warped MPI compared to the target viewpoint, the greater the amount of distortion that will be visible in that warped MPI. The use of weightings ensures that the amount of distortion appearing in the final output image is limited, since images with less distortion are selected preferentially over images exhibiting more distortion.

Figure 2:
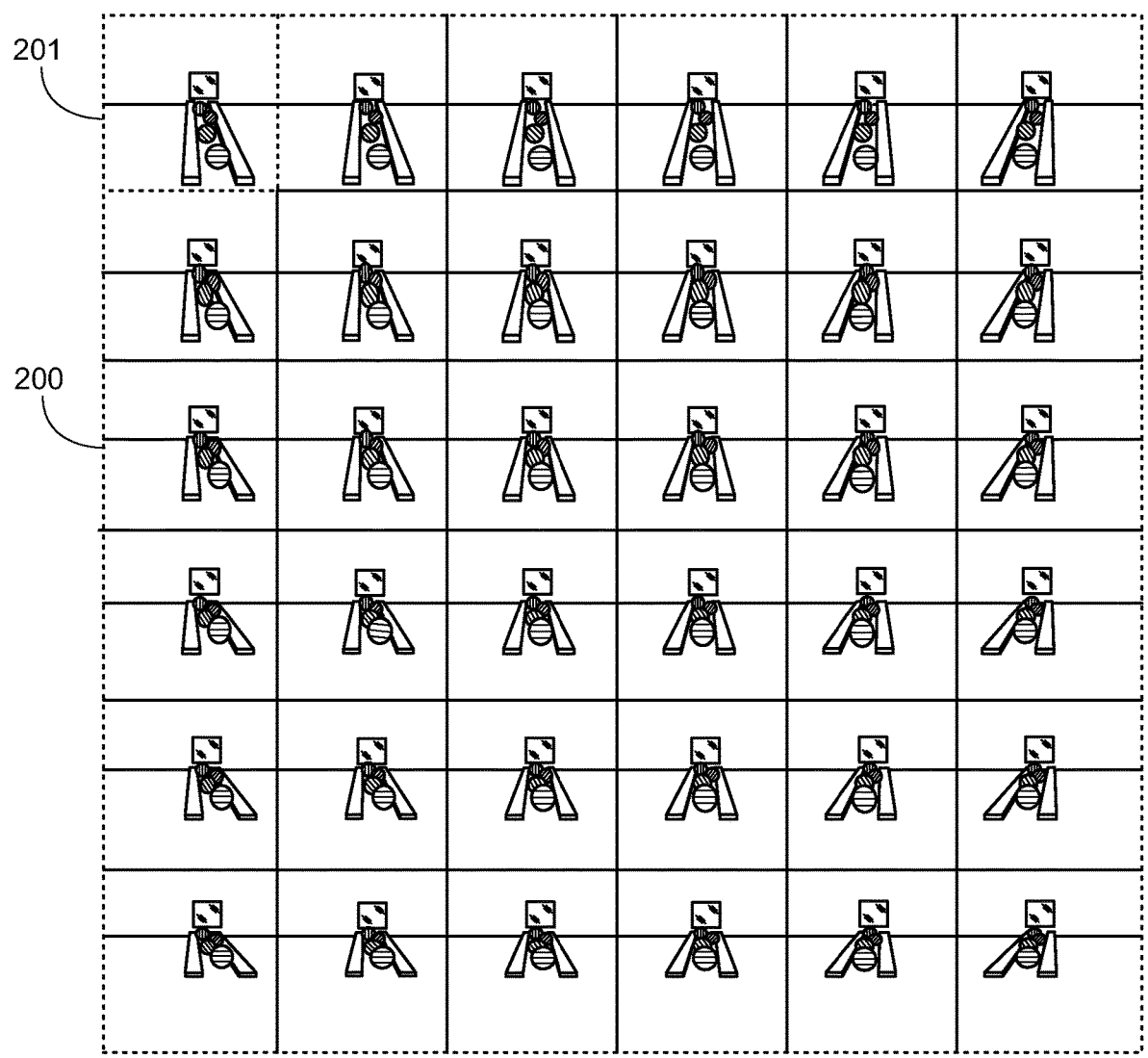
FIG. 2 shows schematically an example of an MPI image within a subset of MPIs.

FIG. 2 shows an example of a plurality of MPIs 200 (prior to any warping) that may be captured as part of the MPI rendering process described above. Each MPI corresponds to a different viewpoint of the virtual scene shown in FIG. 1. The MPIs may correspond to an array of MPIs that are provided as an input to the MPI rendering process described previously in relation to FIG. 1. A first MPI within the array of MPIs 200 is indicated as MPI 201.

In FIG. 2, the virtual scene corresponds to a plurality of balls positioned between two rectangular barriers, with a mirror positioned rearward of the balls. In FIG. 2, three of the balls have a coloured surface and another has a reflective metallic surface. The balls and barriers are shown as resting against a surface (i.e. the floor), with the mirror being angled with respect to a backwall surface.

Figure 3:
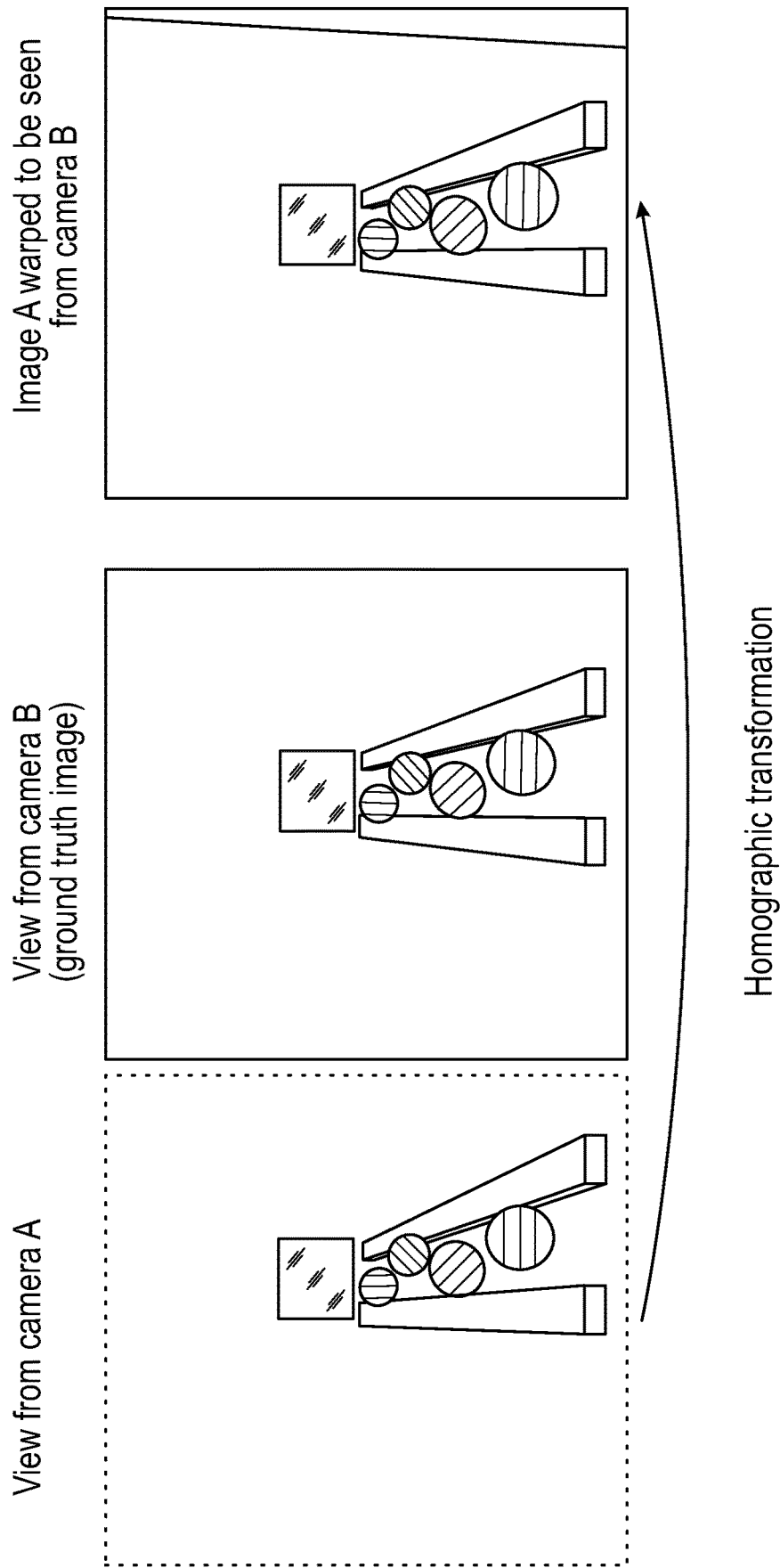
FIG. 3 shows schematically an example of re-projection of image data in an MPI.

FIG. 3 shows an example of the warping process for an MPI.

In FIG. 3, a first image, image A, captured from a first virtual camera, camera A, is shown. Image A corresponds to the MPI captured by 'Cam1' in FIG. 1, prior to any warping.

FIG. 3 also shows a second image of the virtual scene, image B, captured by camera B. The viewpoint of camera B corresponds to the target viewpoint for which an image of the scene is desired. Generally there will not be an image of the virtual scene for the target viewpoint. In FIG. 3, such an image is shown simply to illustrate an example of a target image that is to be estimated from a reference image (image A). In FIG. 3, it can be seen that, compared with image A, image B corresponds to a slightly more head-on view of the virtual scene. In FIG. 3, image B is referred to as the 'ground truth image' as it represents a complete target image.

In FIG. 3, a third image, image C, is shown. Image C corresponds to a warped version of image A, with image A having been warped so as to correspond to the viewpoint from which image B was captured. This warping may be achieved by applying a homographic transform to image A using the known poses of camera A and camera B, for example. In FIG. 3, image C corresponds to the composite image generated from the image planes corresponding to 'Cam1Warped' in FIG. 1, following the 'Alpha Over Blend' operation.

It can be seen in FIG. 3 that, for image C, there are regions for which no corresponding colour information is defined (shown as a black region). These regions correspond to parts of the virtual scene for which there is no corresponding colour information in image A. Such regions may be filled-in using other warped MPIs (not shown) for which there is corresponding colour information. Generally, the larger the number of MPIs captured from different viewpoints, the less likely it is that there will be missing colour information in the final output image.

When blending multiple MPIs together to create a final image, it is not always clear what the best blending approach is. Relevant factors include the closeness of candidate cameras to the target view camera in terms of pose (position and orientation). The larger the number of candidate cameras close in pose to the target camera, the more likely it is that view dependent effects will be adequately captured.

Figure 4:
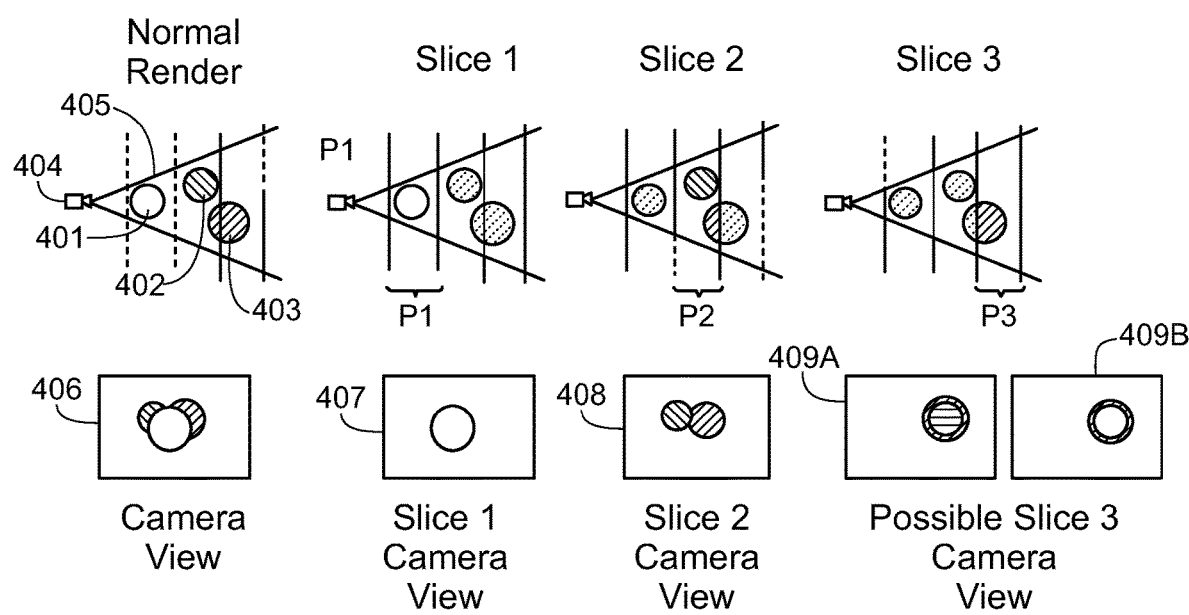
FIG. 4 shows schematically an example of clipping occurring during the capture of an MPI.

Moreover, in some cases, the capturing of an MPI may result in the existence of clipped pixels in the image planes making up the MPI. Pixels describable as "clipped" correspond to part of an object that has been "clipped" by a frontmost clipping plane, as described in greater detail below. Clipped pixels may represent an interior portion of an object that in ideal circumstances would not be visible. FIG. 4 shows schematically an example of how clipped pixels may be present in a given MPI (or individual image plane within a given MPI).

In FIG. 4, a top down view of a virtual scene is shown. The virtual scene comprises a plurality of objects; in this case, corresponding to three coloured balls. The coloured balls are positioned at different depths relative to the virtual camera. In FIG. 4, it can be seen that a first ball 401 is shown closest to the virtual camera, followed by a second ball 402, and then a third ball 403. The coloured balls may correspond to those shown previously in relation to FIGS. 1-3.

In FIG. 4, a virtual camera 404 is shown as being positioned within the virtual scene, having frustum 405 (corresponding to the field of view of camera). The virtual camera 404 is oriented towards the coloured balls so as to capture an image of the coloured balls.

In FIG. 4, a first image 406 is shown. This image 406 corresponds to a 'camera view' of the scene for a 'normal render'. Here, the term 'normal render' refers to an image of the virtual scene that has not been obtained via MPI rendering. For example, image 406 may correspond to a single image of the virtual scene captured by the virtual camera 404. For such a 'normal render', only scene details visible from the perspective of the virtual camera 404 are captured. This is not necessarily the case for an image captured as part of an MPI, as will be explained below.

Clipped Layer Rendering

FIG. 4 also shows a plurality of image planes captured as part of an MPI of the virtual scene. In FIG. 4, images 407, 408 and 409A/409B each correspond to image planes captured as part of an MPI image.

In FIG. 4, it can be seen that the frustum 405 of the virtual camera 404 has been split up into a plurality of successive slices. Each slice corresponds to a respective depth segment, with the extremities of each depth segment being defined by a pair of clipping planes. As will be appreciated, the shape and extent of the viewing frustum 405 of the virtual camera will depend on the type of virtual camera 404 being used to capture the scene. Typically, the shape of the frustum 405 will be a rectangular pyramid, corresponding to a pinhole camera type model. For such a model, the clipping planes are parallel planes, perpendicular to the viewing direction of the virtual camera 404. Each pair of clipping planes truncates the frustum 405 into a respective depth segment.

However, the exact shape and form of the viewing frustum 405 will vary depending on the type of camera lens that is being simulated. For example, for 360 degree images captured using e.g. a fish-eye lens, the frustum may have a spherical shape. Hence, spherical clipping shells may be used to divide such a frustum into depth segments.

In FIG. 4, it can be seen that the clipping planes extend further than the virtual camera frustum 405. It will be appreciated that, in some examples, the clipping planes may not extend further than the frustum 405. In other words, each clipping plane pair may truncate the frustum 405 such that each slice corresponds to sub-division of the volume defined by the frustum 405. Although not shown in FIG. 4, it will be appreciated that the frustum may have an associated near and far plane.

In FIG. 4, a first depth segment, corresponding to slice 1, is shown for the virtual camera. The first depth segment is defined by a first pair of clipping planes P1, which subdivides the frustum 405 of the virtual camera 404 into slice 1. The corresponding image of the virtual scene captured for slice 1 is shown as image 407, i.e. 'Slice 1 Camera View'. As can be seen in FIG. 4, this image 407 corresponds to an image of the frontmost object in the virtual scene, relative to the virtual camera 404. The second and third objects are not visible in image 407 (and hence are shown faded) because they are not contained within the corresponding depth segment.

In FIG. 4, a second depth segment, corresponding to slice 2, is also shown. The second depth segment is defined by a second pair of clipping planes P2. The parts of the scene not contained within the second depth segment are shown as faded. The corresponding image of the part of the scene confined within slice 2 is shown as image 408 ('Slice 2 Camera View'). As can be seen in FIG. 4, for slice 2, only the second and third coloured balls are visible in image 408. The first clipping plane in the pair P2 corresponds to the second clipping plane in the pair P1 (by virtue of the frustum 405 being divided into successive segments).

FIG. 4 also shows a third slice of the frustum 405 of the virtual camera 404, defined by a third pair of clipping planes, P3. In FIG. 4, it can be seen that the first clipping plane in the pair P3 intersects the third coloured ball 403. As a result of this, the corresponding image may show e.g. the inside of the object (as in image 409A) or the outline of it where such an object is hollow (as in image 409B). In any case, the inside of the object would not be visible from the perspective of the virtual camera, and so any pixels corresponding to this region should not be visible in the final output image.

This problem may be addressed by 'capping' any pixels in the image planes that correspond to internal surfaces of an object intersected by a clipping plane. A method for performing this capping, in accordance with the present disclosure, will be described below.

Figure 5:
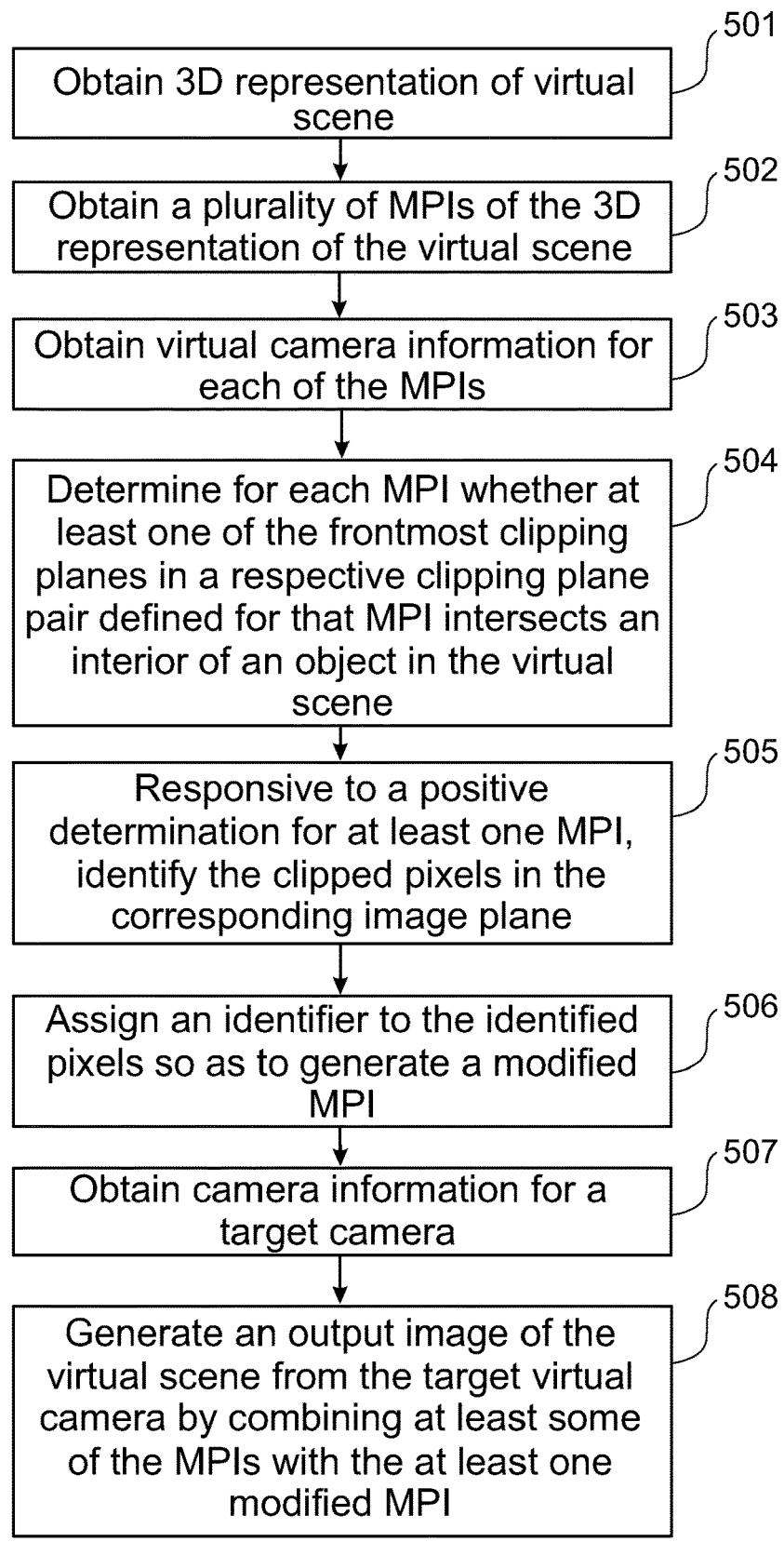
FIG. 5 shows schematically an example of a method for generating a target image in accordance with the present disclosure.

FIG. 5 shows schematically an example of a method for generating an image of a virtual scene from a target viewpoint, in accordance with the present disclosure. The present disclosure is primarily concerned with the capture of MPIs of virtual scenes. That is, scenes for which colour and depth information has been defined in advance, for example, by a graphics artist. For these types of scenes, the relative locations of objects within the scene, their dimensions, colour and depth are typically precisely known.

At a first step 501, a three-dimensional (3D) representation of a virtual scene is obtained. The virtual scene comprises at least one virtual object.

The 3D representation may correspond to a complete 3D reconstruction of the virtual scene. That is, objects and surfaces within the virtual scene may be represented as 3D meshes, with colour information applied to those meshes in the form of texture. Such a 3D representation of the virtual scene may be obtained as an output from a graphical processing unit (GPU) of a computing device, for example. The virtual scene may correspond to a virtual world rendered as part of a video game, with the view of the virtual world being dependent on a player's position and orientation within the virtual world.

Alternatively, or in addition, the 3D representation may correspond fully or at least in part to a point cloud of the virtual scene. It may be that the point cloud is defined as part of e.g. a video game and stored at a location in memory on a computing device at which the video game is being executed. Step 501 may thus comprise retrieving the point cloud from the appropriate location in memory at the computing device, for example.

In some examples, the 3D reconstruction of the scene may include a combination of point cloud data and images, with point cloud data being used for near-field objects and images being used for background parts of the virtual scene. For example, the sky and horizon of the scene may be represented on a planar surface, with the foreground portions of the scene being represented as a point cloud. Generally, point cloud data allows more detail to be captured for a given subject in a scene. Hence, it may be preferable to use point clouds to represent objects that are located closer to the viewer, and thus more likely to be focused on by the viewer.

At a second step 502, a plurality of multi-plane images (MPIs) of the 3D representation of the virtual scene are obtained. Each MPI corresponds to a different viewpoint of the 3D representation of the virtual scene. In the present disclosure, these MPIs correspond to the reference MPIs from which an image of the virtual scene is to be generated for the target viewpoint. Here, 'obtaining' a plurality of MPIs may correspond to capturing a plurality of MPIs. That is, positioning a plurality of virtual cameras within a virtual scene and obtaining corresponding MPIs from those cameras. As will be appreciated, the same effect may be achieved by moving a given virtual camera to a plurality of different positions within the virtual scene.

Figure 6:
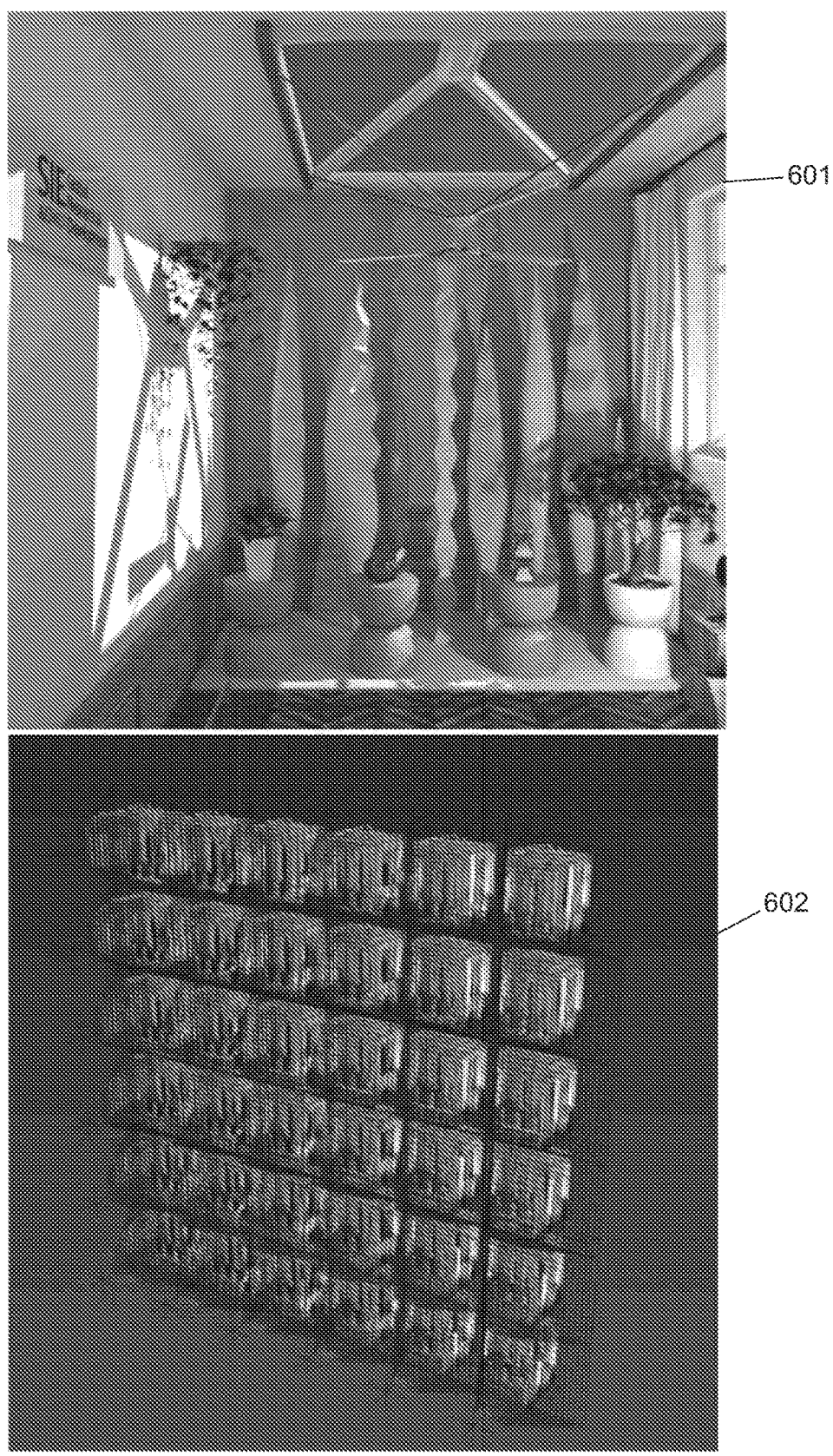
FIG. 6 shows schematically an example of a virtual scene and the capture of a plurality of MPIs.

The capture of an MPI has been described previously in relation to FIG. 4. A further example is shown in FIG. 6, which shows a 6×6 camera grid 602 and the corresponding MPIs captured by each of the cameras in the camera grid. In FIG. 6, the virtual scene 601 is shown as comprising a plurality of complex objects, such as plants.

Returning to FIG. 5, the MPIs obtained at step 502 each comprise a plurality of image planes. Each image plane comprises image data for a different respective successive depth segment of the virtual scene. Each depth segment is defined by a pair of corresponding clipping planes that sub-divides the field of view (i.e. frustum) of the virtual camera that captured the corresponding MPI. The depth range associated with each image plane in a given set of MPIs is defined by the corresponding pair of clipping planes, with each clipping plane defining an upper and lower limit of the associated depth range.

Figure 7:
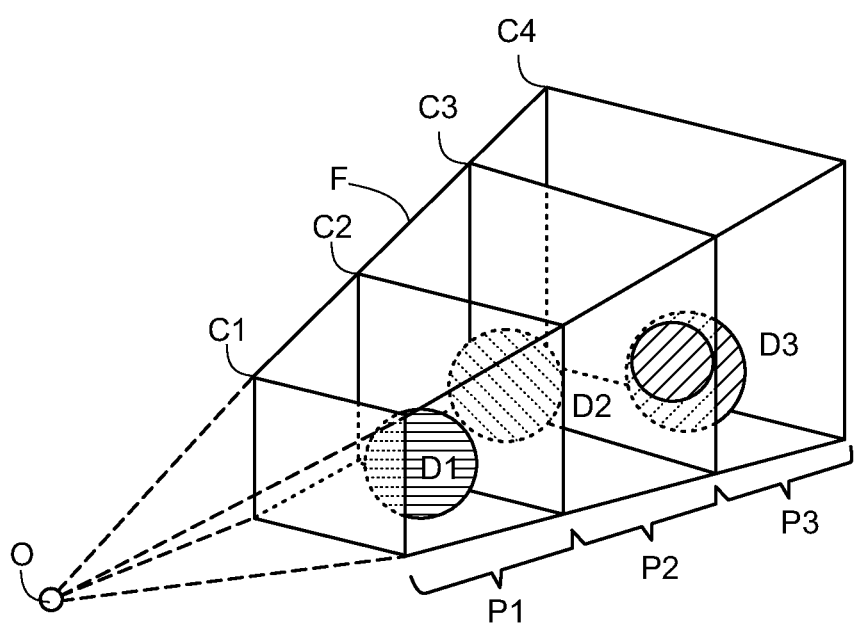
FIG. 7 shows schematically an example of the frustum of a virtual camera sub-divided into a plurality of depth segments.

An example of the splitting of a virtual camera frustum into a plurality of depth segments is illustrated schematically in FIG. 7. FIG. 7 shows schematically a portion of the virtual scene shown previously in relation to FIGS. 1 to 3. The virtual camera is shown as having an origin 'O' and corresponding frustum F. The frustum F is shown as being divided by a plurality of clipping planes C1, C2, C3, C4. As can be seen in FIG. 7, each successive pair of clipping planes, P1, P2, P3, defines respective depth segments D1, D2 and D3. In FIG. 7, it can be seen that the third clipping plane intersects the object located furthest from the virtual camera origin O (as in FIG. 4).

In some embodiments, at least some of the image planes in at least some of the MPIs comprise two-dimensional images. For such image planes, each image plane may correspond to a two-dimensional projection of a different respective portion of the virtual scene within the corresponding depth segment (as shown previously in FIG. 4). The image data for these image planes may correspond to colour pixel information (e.g. RGB or YUV values for each pixel location in the image). These image planes may correspond to RGB-α images, for example. As will be appreciated, in some examples, it may be that all or a majority of the image planes for all or a majority of the MPIs correspond to two-dimensional colour images.

In alternative or additional embodiments, at least some of the image planes in at least some of the MPIs may correspond to respective point clouds. For such image planes, each image plane may correspond to a set of points defining colour and depth information for points within the corresponding depth segment of the virtual scene. In such embodiments, the image data for a given image plane may correspond to a set of point cloud data. The point cloud data may correspond to e.g. an RGB-D image, such that each MPI comprises a plurality of RGB-D images split by depth range. The depth information for a given depth segment may be obtained based on e.g. the known intrinsics and extrinsics of the virtual camera, for example.

In some examples, it may be that point cloud data is captured for image planes corresponding to depth segments located nearer the corresponding virtual camera origin, with two-dimensional colour images being captured for the more distant depth segments defined for that virtual camera.

At a third step 503, virtual camera information is obtained for each of the obtained MPIs. The virtual camera information may define, for each MPI, the extrinsics (e.g. camera pose) and intrinsics (e.g. focal length) of the virtual camera that captured the corresponding MPI. The viewpoint of the or each virtual camera may be defined in terms of corresponding pose data. For virtual scenes, the cameras will be virtual and so the camera information (extrinsics, intrinsics, etc.) will generally be known.

At a fourth step 504, it is determined for each MPI, whether at least one of the frontmost clipping planes in a respective clipping plane pair defined for that MPI intersects an interior of an object within the 3D representation of the virtual scene. A clipping plane in a respective pair is said to be 'frontmost' if it is located closer to the origin of the corresponding virtual camera than the other clipping plane in that pair. For example, in FIG. 7, clipping plane C1 is the frontmost clipping plane for clipping plane pair P1. Similarly, clipping planes C2 and C3 are the frontmost clipping planes for pairs P2 and P3 respectively.

As seen previously in relation to FIG. 4, the intersection of the rearward clipping plane in pair P2 of object 403 does not result in any internal surfaces of that object being visible in the corresponding image plane 408. It is only when the frontmost clipping plane in a respective pair intersects an object that the corresponding internal surface region is visible in the corresponding image plane (see planes 409A, 409B). Hence, step 504 comprises determining for each MPI, whether the frontmost clipping plane in each clipping plane pair intersects an object in the virtual scene.

In some examples, determining for each MPI, whether at least one of the clipping planes defined for that MPI intersects an interior of the object (i.e. step 504) comprises casting a plurality of rays into the 3D representation of the virtual scene. For each MPI, the rays are cast from the corresponding respective virtual camera. In some examples, this may involve casting rays from the origin defined for each virtual camera through the corresponding pixels associated with the 2D camera view of that virtual camera, into the 3D representation of the virtual scene.

Having cast a plurality of rays into the 3D representation for a given virtual camera, the respective locations of the clipping planes defined for that virtual camera are obtained. The size, shape and location of the frustum of each virtual camera relative to the 3D virtual scene may be known from the obtained virtual camera information, for example. The locations of the clipping plane pairs can thus be determined since they will correspond to respective plane locations within the frustum of the corresponding virtual camera.

For each obtained clipping plane location, it may then be determined whether at least one of the cast rays is located inside or outside of the object, at that clipping plane location. A clipping plane in a respective pair may be determined as intersecting an object if the location of at least one of the clipping planes in that pair coincides with a with a location at which at least one of the cast rays is determined as being located inside the object. This calculation may be performed for each clipping plane that is known to be a frontmost clipping plane in a pair. As will be appreciated, if the virtual camera frustum is divided into successive depth segments then the rearward clipping plane of one pair will likely form the frontmost clipping plane of the next pair. Hence, this calculation may be performed for a majority of the clipping planes defined for a given MPI.

Figure 8:
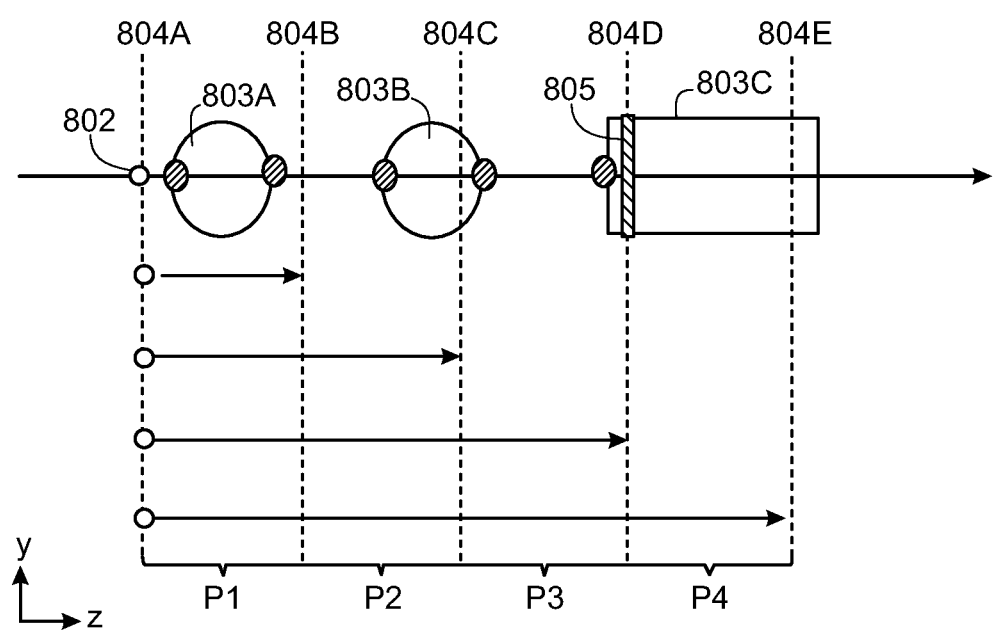
FIG. 8 shows schematically an example of ray-casting being used to determine whether a frontmost clipping plane intersects a virtual object in a virtual scene.

An example of this ray-casting technique is shown in FIG. 8, which shows a plurality of rays cast into a virtual scene. In FIG. 8, the virtual scene is shown side-on (i.e. in depth, z), with the y-axis corresponding to the vertical. The virtual scene comprises a plurality of objects 803A, 803B, 803C.

In FIG. 8, each ray is shown as being fired through a corresponding pixel location 802 of the virtual camera. In FIG. 8, the distance between pixels is exaggerated for reasons of clarity. The origin of the virtual camera is not shown; it will be appreciated that this would generally be behind the pixels of the virtual camera.

In FIG. 8, the clipping plane pairs are indicated by vertical lines 804A, 804B, 804C, 804D. Each pair of successive clipping plane pairs defines clipping plane pairs P1, P2, P3 and P4 respectively. As can be seen in FIG. 8, clipping plane 804D intersects the object furthest from the virtual camera. Clipping plane 804D corresponds to the frontmost clipping plane for clipping plane pair P4. As described above, it is generally undesirable to have a frontmost clipping plane intersect an internal surface of an object, as the corresponding image plane will include parts of the object that are supposed to be occluded from the perspective of the corresponding virtual camera. In FIG. 8, the clipping of the rearmost object is indicated by the thicker line 805 that coincides with clipping plane 804D. The thicker line 805 indicates a clipped region—i.e. an area which if not handled properly, will show the inside of the object in the corresponding image.

Determining whether a clipping plane intersects an object may involve counting the number of intersections between a cast ray and an enclosed volume. For example, for the fourth ray shown in FIG. 8, it may be determined that at the clipping plane location 804D the ray is 'inside' the object, since the ray will have passed through object 803A, out of object 803A, inside object 803B, out of object 803B, and into object 803C.

In some examples, step 504 may comprise generating a plurality of 3D slices of the virtual scene based on corresponding obtained colour and depth information. Each 3D slice may correspond to a 3D reconstruction of the portion of the scene within a different respective one of the depth segments.

The step of casting a plurality of rays into the 3D representation (described above) may be done on a per three-dimensional slice basis, such that for each pair of clipping planes, rays are cast into the corresponding three-dimensional slice of the virtual scene. Each three-dimensional slice may correspond to a 3D reconstruction of the virtual scene within the corresponding depth segment. In such examples, it may be that each three-dimensional slice is rendered in isolation, with the casting of rays having to be repeated for each subsequent three-dimensional slice that is rendered. The casting of rays into the scene on a per-three-dimensional slice basis may occur where computer-generated image rendering software such as 'V-Ray' is used for rendering the 3D scene. VRay supports the rendering of virtual scenes capped by clipping planes. However, in VRay, each slice of the 3D scene is rendered in isolation, with the scene database having to be reloaded for each render, and rays re-traced for each slide. As will be appreciated, this is a sub-optimal process.

In some embodiments, a renderer modified to render a plurality of 3D slices in parallel is used to render the 3D reconstruction of the virtual scene. The use of such a renderer enables information to be shared about the scene between all layers and avoids the need to have to re-compute intersections of clipping planes for each three-dimensional slice. By rendering all of the 3D slices in parallel, each ray cast into the scene can be followed and the corresponding layer (depth segment) can be checked at different locations. If an intersection between a frontmost clipping plane is determined for a given depth segment, that layer can be updated accordingly (as below). A renderer adapted in such a way would incur higher memory costs (having to render the entire 3D scene within the frustum) but this would be offset by fewer calculations having to be repeated (e.g. do not need to re-load the scene database, render it, cast rays, for each individual depth segment).

Returning to FIG. 5, at a fifth step 505, responsive to a determination for at least one of the MPIs that at least one of the frontmost clipping plane pairs defined for that MPI intersects an interior of an object in the virtual scene (i.e. a positive determination), the corresponding image data in the corresponding image plane is identified. Here the image plane is 'corresponding' in the sense that it corresponds to the portion of the virtual scene between the clipping plane pair for which the frontmost clipping plane has been determined as intersecting an object in the virtual scene.

As mentioned previously, each image plane may be formed of colour pixels or point cloud data and so step 505 may comprise identifying the colour pixels or points in the image plane that correspond to the portion of the object intersected by a frontmost clipping plane. These identified pixels or points may be said to correspond to 'clipped pixels' or 'clipped points', i.e. they correspond to part of an object that has been 'clipped' by a frontmost clipping plane. This identification may be repeated for each image plane in a respective set (i.e. MPI) for which pixels/points have been determined as corresponding to an object intersected by a frontmost clipping plane.

At a sixth step 506, the image data identified as part of step 506 is assigned an identifier. That is, for each image plane in a respective MPI, the pixels or points identified as corresponding to an intersected interior of an object are assigned an identifier. This results in a modified version of the corresponding MPI. The process of assigning an identifier to the identified pixels or points corresponds to a 'capping' of the intersected object. The object is said to be capped in the sense that region of the object intersected by the frontmost clipping plane can be identified and handled differently, as will be described below.

The output of step 506 may be one or more modified MPIs, wherein each modified MPI comprises at least one image plane for which pixels or points have been assigned an identifier. The number of image planes (and MPIs) comprising pixels or points assigned an identifier will generally depend on the layout of the objects within the virtual scene, as well as the manner in which the frustum of each virtual camera is sub-divided. The positioning of the clipping planes within a given frustum may correspond to a uniform (i.e. equal spacing) or non-uniform distribution.

In some examples, the identifier assigned to the identified pixels or points comprises an object material identifier. By assigning an object identifier to the identified pixels, the clipped pixels or points can be identified exactly and associated with a specific material. In some examples, each pixel or point of each image plane may have an additional channel in which the object material identifier is stored. In some examples, it may be that a single bit mask (a so-called 'clipping mask') is defined for each image plane, with bits corresponding to '1' corresponding to clipped pixels or points, for example. In some examples, the object identifier may be used in a corresponding look-up table (LUT) to find the material and/or object properties of the corresponding pixel.

Figure 9:
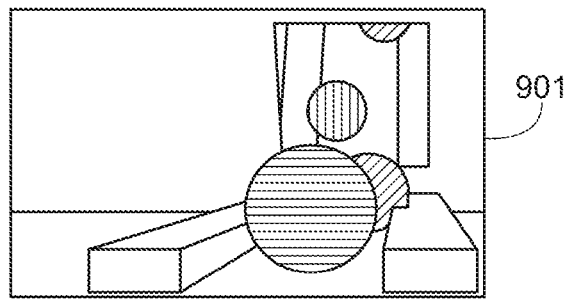
FIG. 9 shows an example of an object ID channel for a corresponding image plane.
Figure 9:
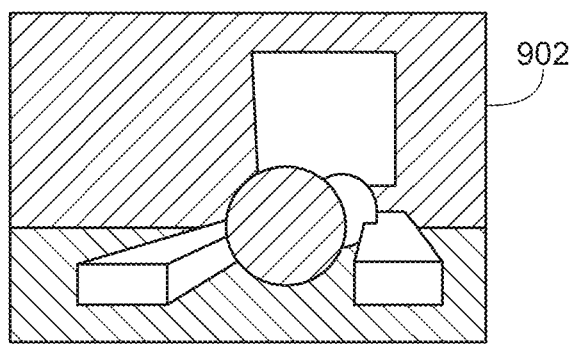

FIG. 9 shows an example of a mask defined for an image plane of an MPI. In FIG. 9, a colour image 901 of a virtual scene is shown from a virtual camera viewpoint. In FIG. 9, it can be seen that there is an additional object ID channel 902 defined for the colour image. The object ID channel 902 defines for each pixel in the corresponding colour image 901, an object ID associated with that pixel. In some examples, there may be further image data channels, such as e.g. an image data channel for surface normal information. As will be appreciated, where the image plane comprises point cloud data, the colour image shown in FIG. 9 may also be associated with a corresponding depth image.

Figure 9A:
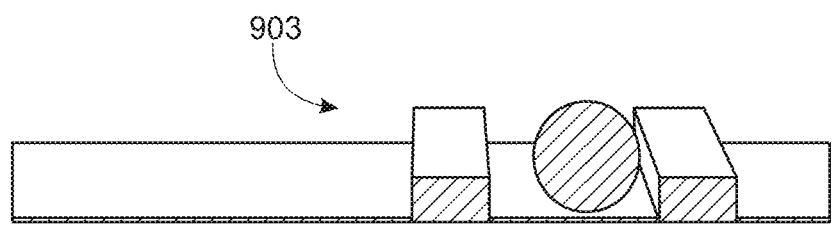
FIG. 9A shows an example of a clipping mask defined for an image plane of an MPI.
Figure 9A:
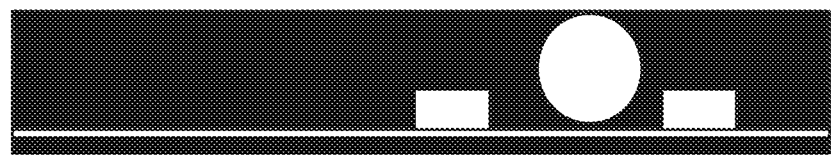

FIG. 9A shows an example of a clipping mask defined for an image plane of an MPI. In FIG. 9A, a colour image 903 of an MPI extracted from a virtual scene is shown from a virtual camera viewpoint. In this case, colour image 903 is extracted from the virtual scene of FIG. 2. Shown in forward slash spaced shading to represent the colour blue in FIG. 9A are those areas of the image 903 determined to correspond to the interior of an object. Also in FIG. 9A is a single-bit clipping mask 904 defined for the image 903. White areas of the clipping mask are bits which correspond to a "1", which indicates that the pixels of those areas are clipped pixels, i.e. those pixels correspond to interiors of objects. Black areas are bits which correspond to a "0", indicating that those pixels are not clipped pixels and do not correspond to interiors of objects in the virtual scene.

In some examples, assigning an identifier to the identified image data in a respective image plane may comprise replacing or modifying the identified image data so as to cap the intersected internal surface of the object. In other words, the identified pixels or points (identified as above) may be modified in some way such that the intersected interior of the object can be clearly recognized in that image plane.

However, in some examples, the identified pixels or points may simply be assigned an identifier, which is then used to modify pixels in the final output image. That is, there may not necessarily be any modification of any pixels in the individual image planes making up the respective MPIs. As will be appreciated, as multiple image planes in a given MPI are combined, clipped pixels (or points) in one image plane may be superimposed with non-clipped pixels (or points) in another image plane (corresponding to a closer depth segment relative to the virtual camera). However, even after this combination of image planes, clipped pixels (or points) may still be present in the resulting composite image, and final image generated from the blending of multiple composite images. Having at least identified these clipped pixels (or points), these can be identified in the final output image and modified accordingly (as will be described below).

Figure 10:
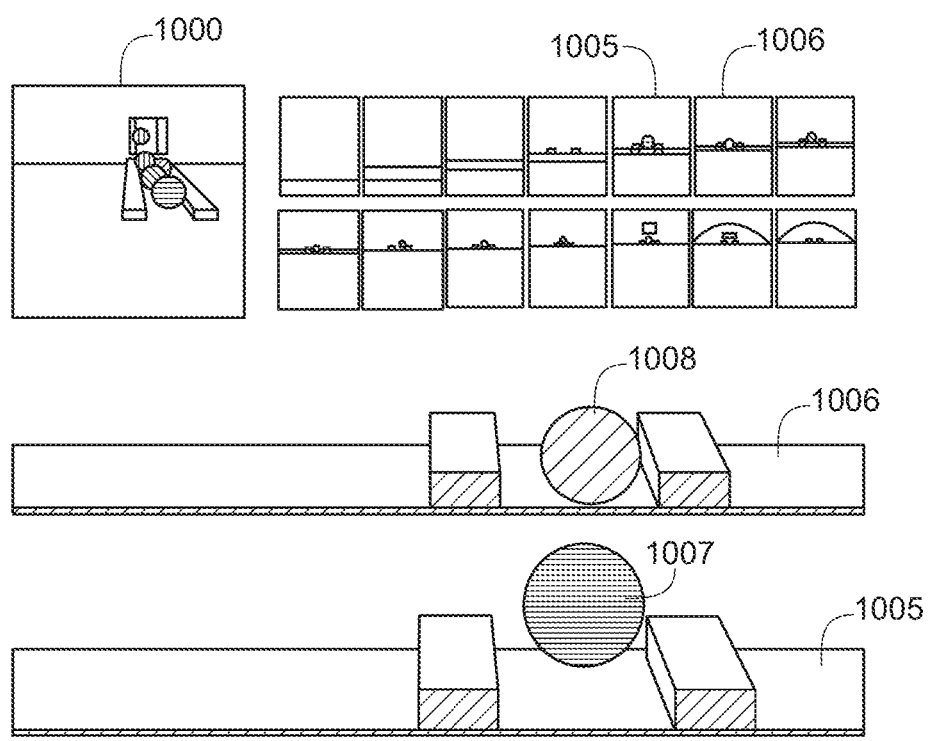
FIG. 10 shows an example of capped pixels in two image planes of an MPI.

FIG. 10 shows an example of pixels in an image plane that have been capped in accordance with the present disclosure. In FIG. 10, a multi-plane image 1000 of the virtual scene shown previously in relation to FIGS. 1-3 is shown. Each of the image planes making up MPI 1000 are shown to the right of MPI 1000 (the MPI comprising 14 image planes in total). Two image planes 1005, 1006 are shown enlarged with the corresponding capped regions shown in forward slash spaced shading, which represents the solid colour blue. In the case of image plane 1005, the clipping plane is in front of the horizontally shaded sphere (representing a yellow sphere) and so this sphere is rendered as normal. However, the clipping plane intersects the barrier and floor surface and so these regions are shown in forward slash spaced shading (representing blue).

In the case of image plane 1006, the back half of the back slash shaded (to represent red) sphere is intersected by the frontmost clipping plane in the corresponding clipping plane pair. As a result, the interior of the back slash shaded (red) sphere is shown as being completely capped with forward slash spaced shaded pixels 1008.

It will be appreciated that in FIG. 10, forward slash spaced shaded pixels are shown to aid in distinguishing the clipped pixels 1008 from the other pixels in the corresponding image plane. In reality, capping the clipped pixels 1008 need not necessarily comprise replacing those pixels with a solid colour. In FIG. 10, a forward slash spaced shading representing blue is used for visualisation. Ultimately, the clipped pixels 1008 are assigned a unique identifier (as in step 506) and can thus be handled differently to the other pixels in the image plane that have not been assigned an identifier or have been assigned a different identifier.

In some examples, at least some of the objects in the virtual scene may comprise enclosed volumes in which at least one other object is contained. For example, where the virtual scene corresponds to a virtual world rendered as part of a video game, it may be that objects such as in-game items are concealed within other objects such as e.g. crates, inaccessible rooms, etc. In some cases, it may be desirable to prevent a player from seeing these concealed objects so as to maintain some level of mystery or at least realism. By capping the clipped pixels, these concealed objects can be shielded from view in the corresponding image plane.

It will be noted that in the above-described examples, the objects have been of a relatively simple geometry (spheres). For more complex geometry, such as e.g. a shrub model, it may be necessary to flag that some of the rendering material is double-sided, e.g. such as leaves. Objects counted as double-sided are those modelled with no thickness, like leaves, and pieces of cloth. By flagging the material in this way, the renderer can count each intersection twice (entering and leaving the object) to ensure that the counting is consistent with the number of objects counted, thus avoiding errors associated with warping the complex geometry of the shrub.

Returning to FIG. 5, at a seventh step 507, camera information for a virtual target camera is obtained. The target virtual camera corresponds to the target viewpoint from which an image of the virtual scene is to be synthesized using the captured MPIs. In some examples, the target camera information comprises a pose of the target virtual camera. The target camera information may also include the intrinsics (e.g. focal length) of the target virtual camera, for example.

In some examples, the target viewpoint corresponds to a player's view of a virtual world rendered as part of a video game. The target viewpoint may change in dependence on player inputs received at an input device being used to play the video game. For example, the target viewpoint may vary in accordance with at least one of: (i) detected motion of a head-mountable display (HMD), (ii) motion of a hand-holdable input device (e.g. games controller), (iii) motion of a thumbstick on an input device, (iv) button presses made a tan input device, (v) touch inputs received at input device, etc.

At an eighth step 508, an output image of the virtual scene from the viewpoint of the target camera is generated. Step 508 comprises combining at least some of the MPIs together, wherein at least one of the MPIs comprises a modified MPI (as in step 506). The combination of the at least some MPIs may involve blending the at least some MPIs together in dependence on a relative difference in pose between the target camera and the virtual camera poses associated with the captured the MPIs that are to be combined. The output image may correspond to a two-dimensional image of the virtual scene from the viewpoint of the target virtual camera.

In some examples, there may be a prior step (not shown), that involves selecting a plurality of candidate MPIs from a larger pool of MPIs, for blending together. The candidate MPIs may be selected based on how close the virtual camera pose for those MPIs corresponds with the pose of the target virtual camera. Generally, it is expected that at least one of the modified MPIs will correspond to a selected candidate MPI, by virtue of having a sufficiently similar viewpoint to that of the target virtual camera.

In some examples, generating the output image may comprise generating a plurality of composite images from the MPIs that are to be combined. That is, for each of the at least some MPIs, a corresponding respective composite image is generated.

Each composite image may be generated by re-projecting the image data in each of the individual planes making up that multi-plane image. The re-projection may be dependent on the difference in pose between the target virtual camera and the virtual camera that captured the corresponding MPI. The generated composite images may then be blended together so as to generate the output image. As described previously, the blending may be performed in accordance with a blending equation, with MPIs having viewpoints that more closely correspond with the target viewpoint providing a greater contribution to the final output image.

In examples where the image planes comprise two-dimensional images the re-projection may involve distorting or warping each of the individual planes in the corresponding respective multi-plane image. This may correspond to the case where the image planes correspond to two-dimensional colour images, such as RGB-α planes, for example. The warped/distorted image planes may then be blended together in accordance with an 'Alpha Blend Over' operation, so as to generate a corresponding composite image. (as described previously).

In examples where the image planes comprise sets of point cloud data, the re-projection may comprise re-projecting the points in each image plane. In such examples, the final output image may correspond to a two-dimensional projection of the composite (re-projected) point cloud from the perspective of the target camera. The re-projection of points in a point cloud may result in fewer or no re-projection errors compared with the warping of two-dimensional image planes. However, re-projecting the points in the point cloud for each depth segment may be computationally more expensive than re-projecting the corresponding 2D projection (i.e. image) of that depth segment.

Figure 11:
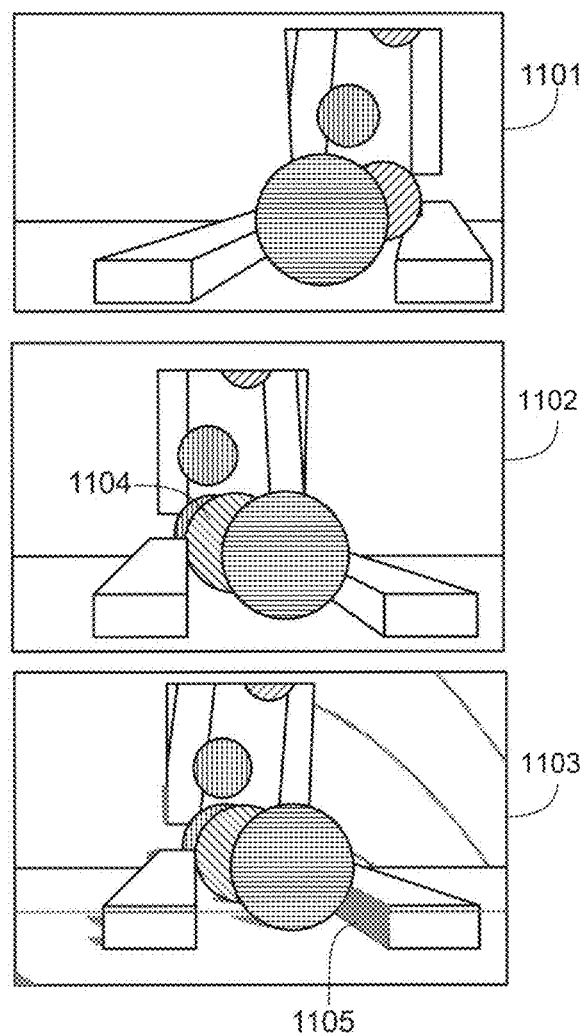
FIG. 11 shows an example of point cloud data of an MPI re-projected to a target viewpoint.

FIG. 11 shows an example of a captured MPI 1101 comprising point cloud data. In FIG. 11, a target image 1102 of the virtual scene from the viewpoint of a target camera is also shown. As mentioned previously, this image 1102 will generally not be available but is presented here to show what is to be synthesized from the existing, obtained MPIs. In FIG. 11, an MPI following re-projection of the corresponding image data (points) is also shown. This re-projected MPI 1103 corresponds to a synthesized view of the virtual scene from the viewpoint of the target camera. As can be seen in FIG. 11, the back slash shaded (red) sphere 1104 is not present in the captured MPI but is visible in the synthesized view. This is because point cloud data has been obtained for that object in the original capture. In FIG. 11, areas shown in sloid shading (representing magenta) 1105 correspond to disoccluded areas that need to be filled in before rendering (exaggerated in FIG. 11 since only a single MPI is shown). In FIG. 11 it can also be seen that there are gaps in the horizontal shaded (yellow) and back slash shaded (red) sphere; these gaps may arise from under-sampling of the points in the point cloud, for example.

For either type of image data (pixels or points), the re-projection may correspond to applying a homographic transformation to the image data in the respective image plane. The homographic transformation may correspond to a transformation from the pose of the camera that captured the corresponding MPI to the pose of the target virtual camera. This re-projection may be repeated for each set of image planes in the respective MPIs (as shown previously in relation to FIG. 1). A composite image may be generated for each of the at least some MPIs, in this manner. That is, for each of the MPIs, a corresponding composite image is generated, with each composite image comprising a blending of image planes comprising re-projected image data.

Following the generation of the composite images and blending of these images together (as above), it may be that there are still pixels visible in the output image that correspond to clipped pixels (or points). Hence, in some examples, the method may comprise determining whether any of the pixels in the output image correspond to image data assigned an identifier in the at least one modified multi-plane image. Responsive to a positive determination for at least some of the colour pixels in the output colour image, the corresponding pixels in the output image may be identified. This identification may be performed based on the object ID associated with the pixels contributing to the final output image. For example, pixels corresponding to clipped pixels can be identified based on a corresponding object ID (as above).

Having identified the clipped pixels in the final output image, the identified pixels may be modified. This modification may involve modifying the colour associated with the identified pixels in dependence on the colour of other pixels in the output image. For example, a morphological dilation may be performed for each region of clipped pixels in the output image, with colour information from neighbouring regions being used to fill-in each region corresponding to clipped pixels. By assigning the clipped pixels a corresponding identifier, these pixels can easily be identified in the final output image and corrected accordingly.

It has been noted by the inventors that, for objects spanning multiple image planes, accurate re-projections are needed in order to ensure that the there is a seamless progression from one image plane to the next. Any errors in the re-projection can result in discontinuities appearing in the composite image. To limit such errors, it may be preferable to use image planes corresponding to point clouds (as above), since the re-projection of points rather than two-dimensional planes is more likely to preserve any lines or circles in the resulting composite (and therefore, final) image.

Figure 12:
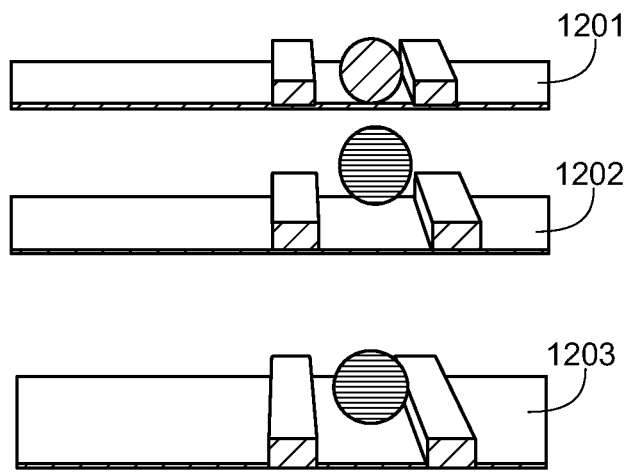
FIG. 12 shows an example of the generation of a composite image from two individual image planes of an MPI.
Figure 13:
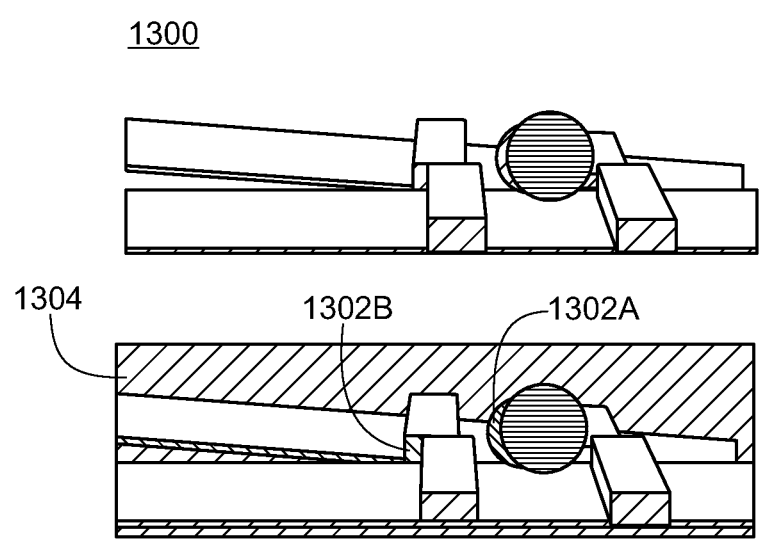
FIG. 13 shows an example of clipped or capped pixels appearing in a composite image.

FIG. 12 shows an idealised composite image. In FIG. 12, two image planes corresponding to different depth segments of a virtual scene are shown as images 1201, 1202. The combination of the two image planes is shown as a composite image 1203. Composite image 1203 represents an idealised scenario where there are no clipped pixels for the sphere. Clipped pixels are still visible for the barrier and floor regions, but it will be assumed that there are further image planes (not shown) are available to fill-in these pixels. FIG. 13 shows an exaggerated example of clipped pixels appearing in a composite image 1300. In FIG. 13, it can be seen that, for the second (backmost) image plane, regions corresponding to where the sphere, barrier and floor were intersected by the corresponding frontmost clipping plane are visible as back slash shading (representing red) pixels. As noted previously, the colour of the clipped pixels need not necessarily be modified to be a solid colour (in this case, red). In FIG. 13, back slash shading (representing red) pixels 1302A, 1302B are shown to distinguish these pixels from non-clipped pixels. In any case, it is desirable to modify the appearance of the clipped pixels such that they are less perceptible in the composite image (and therefore any final output images generated from that composite image).

In some examples, the clipped areas in each image plane can be tracked with a clipping mask. A pixel (or point) in the mask may be cleared when some valid data is found, either from a new image plane within the set (for the MPI) or from a new MPI (corresponding to a different viewpoint). Here, 'valid data' refers to colour information that does not correspond to a clipped region, and that can be used in place of the clipped pixels (or points). For example, in FIG. 13, valid data may correspond to the part of the clipped sphere in the first image plane that occludes the intersected cross-section of the sphere in the second image, when blended using an 'Alpha Over Blend' operation.

In an ideal scenario, after blending each of the MPIs from multiple virtual cameras, the clipping mask will be empty (i.e. valid data found for all pixels). However, when the clipping mask is not empty, the clipped pixels in the output image can be identified, and the corresponding holes in-filled via morphological operations. For example, areas surrounding a hole region can be dilated so as to fill the hole region.

In FIG. 13, a spaced slash shaded (representing green) region 1304 is also shown. This green region 1304 corresponds to gaps in the composite image that may occur due to warping errors. These regions may be similarly identified and assigned an identifier, so that they can be filled-in appropriately if still visible in the final output image. In some examples, a machine learning model may be trained and used to perform this hole-filling.

As mentioned previously, in some embodiments, the virtual scene comprises a virtual scene rendered by a video game processor. For example, the virtual scene may correspond to a 3D virtual scene rendered by a GPU of a computing device configured to execute a video game programme. The video game machine may correspond to a games console or e.g. a cloud gaming server, for example. In such embodiments, the obtained pose of the target camera may correspond to a player's view of the virtual scene. The player's view of the scene may be controllable based on player inputs. Hence, the pose of the target virtual camera may be determined in dependence on a user input generated at an input device and received at the video game processor. The player input may be relayed to the video game processor by an appropriate communication channel (e.g. a wired or wireless connection, communications network, etc.).

In some embodiments, at least some of the above-described method may be performed at a server (i.e. by a computer programme executing corresponding instructions). The server may correspond to a cloud gaming server that executes a video game programme and is responsible for rendering at least some of the virtual world defined by the video game programme. The server may be in communication with a client device via a communications network, such as the Internet.

In some examples, the server may perform each of the above described method steps. In such examples, the client device may simply receive the final output images (with any hole-filling applied) and output these at an associated display.

In alternative examples, the method steps may be distributed across the server and the client device. For example, the server may perform at least the steps of capturing the MPIs, assigning of identifiers to pixels (or points) identified as corresponding to clipped pixels (or points) and optionally, re-projecting the image data in dependence on the difference in pose relative to the target pose. The client device may then perform the steps of generating the composite image from the received warped images and combining these to generate the final image. Such a distribution of work may be preferable where, for example, the client device can store the received image planes and swap individual image planes with any new planes received from the server (corresponding to updated portions of the virtual scene).

In this way, the amount of data that needs to be sent to the client from the server, can be reduced. Ultimately, the distribution of work will depend on the computational power of the client device. If the client device is a games console, such as e.g. PlayStation 5®, then it may be that PlayStation is able to perform a majority if not all of the above-described method steps.

There a number of advantages associated with MPI rendering compared with other rendering techniques. For example, MPI rendering algorithms tend to be faster than algorithms that rely on the computation of complex meshes from point cloud data. This is because MPI rendering algorithms tend to involve simpler operations than e.g. complex mesh calculations and can therefore be run on devices with more limited graphics rendering capabilities.

MPI rendering may also be beneficial where scenes include complex objects such as e.g. smoke or hair. Such objects are typically difficult to represent as 3D meshes without incurring significant processing costs. With MPI rendering, these objects can simply be represented as a plurality of RGB-α planes (i.e. images) or point cloud points, which can be re-projected appropriately in dependence on the target viewpoint.

Figure 14:
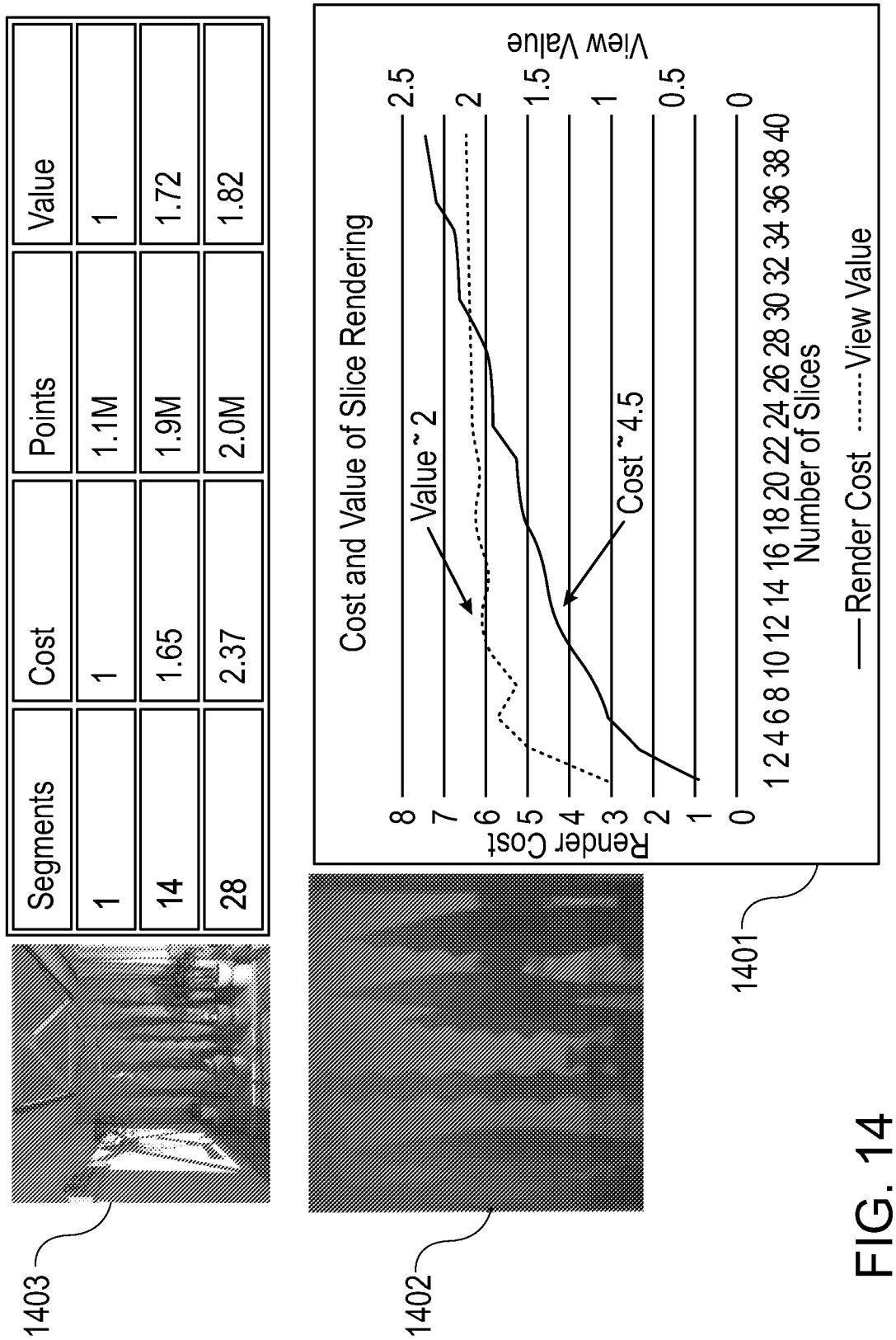
FIG. 14 shows the rendering cost and view value as a function of the number of depth segments used to capture an MPI.

Furthermore, in some cases, the capture of an MPI can be more efficient than rendering a virtual scene from a plurality of different viewpoints. In FIG. 14, the rendering cost, number of points, and value is shown as a function of the number of segments (i.e. slices) that the frustum of the virtual camera is divided up into (chart 1401). Here, the rendering cost corresponds to the time taken to render the segments. The value corresponds to the number of points generated compared with those generated for a single segment, i.e. the number of additional points one can obtain with the given number of segments.

In FIG. 14, it can be seen that, with 14 slices, 70% more points are obtained for less than the cost of rendering the scene twice (1.65). Moreover, some of these points may be difficult to capture if non-segmented rendering is used. For example, returning to the virtual scene shown in FIG. 6, it can be seen that there are shadows cast on the back wall by the occluding foreground objects. By increasing the number of depth segments that the virtual camera frustum is divided into, these occluded parts can be better captured in a corresponding image plane. In FIG. 14, these shadows are all captured in corresponding image slice 1402. The corresponding multi-plane image is shown as MPI 1403.

In traditional rendering methods, a greater number of virtual cameras would be needed in order to capture colour information for parts of the scene occluded for one of the virtual cameras. With segmented rendering, these parts of the scene can be captured by increasing the granularity with which the frustum of the virtual camera is sub-divided. Hence, in some embodiments, it may be that MPIs are obtained for only a few virtual cameras, provided that a larger number of depth segments are defined for those cameras. By reducing the number of virtual cameras used, it may be possible to reduce the amount of re-rendering that is required as the virtual scene changes. For example, if it is known that a new object has entered the scene at a specific depth range, a new image plane for that depth range can be captured by the virtual camera. This new image plane can thus be combined with the existing image planes. For video games, it is generally expected that the location, size and shape of each object in the virtual scene is known. Hence, corresponding image planes can be re-captured for specific parts of the virtual scene that require updating.

As mentioned above, in some examples, the rendering of the virtual scene and capturing of MPIs may be performed at a server. In such examples, it may be that the amount of data that needs to be sent from the server to the client device in order to render an image of the scene from the target viewpoint, is reduced. This is because the server may re-render and obtain image planes for only those segments of the scene that have been updated. Hence, the server may need only send over the corresponding image planes to the client, which can then perform the necessary warping/re-projection so as to generate an updated composite image, and accordingly, an updated output image. In this way, the amount of network traffic generated for a cloud-based video game may be reduced.

Figure 15:
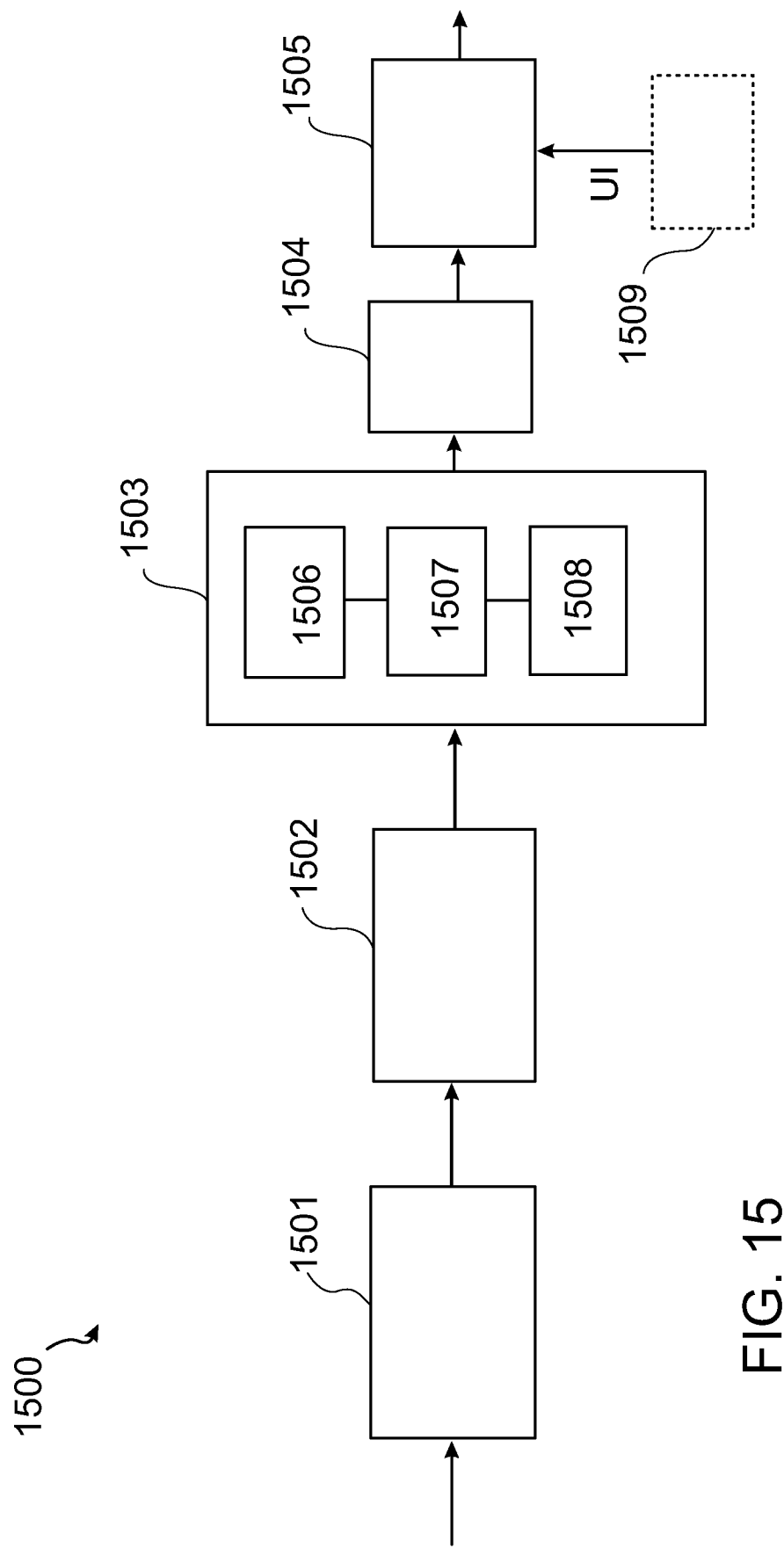
FIG. 15 shows schematically an example of a system for generating a target image in accordance with the present disclosure.

FIG. 15 shows schematically an example of a system 1500 for generating an image of a virtual scene from a target viewpoint.

The system 1500 comprises a virtual scene unit 1501, a multi-plane imaging unit 1502, a clipping processor 1503, a capping processor 1504 and rendering processor 1505. The system 1500 is configured to perform any of the previously described methods, as will be described below.

The virtual scene unit 1501 is operable to obtain a three-dimensional representation of a virtual scene comprising at least one virtual object. The three-dimensional representation of the virtual scene may correspond to any of those described previously (e.g. a point cloud, a textured or untextured mesh representation, etc.). In FIG. 15, the virtual scene unit 1501 is shown as receiving an input. This input may correspond to the 3D representation of the virtual scene, rendered, for example, by a Graphics Processing Unit (GPU) of a video game playing device.

The multi-plane imaging unit 1502 is operable to capture a plurality of multi-plane images of the three-dimensional representation of the virtual scene, each multi-plane image corresponding to a different respective viewpoint of the virtual scene captured by a virtual camera. As described previously, each multi-plane image comprises a plurality of image planes wherein each image plane comprises image data for a different respective depth segment of the virtual scene. As seen previously in relation to FIGS. 4 and 7, each depth segment is defined by a respective pair of corresponding clipping planes that sub-divides the frustum of the virtual camera that captured the corresponding multi-plane image.

The multi-plane imaging unit 1502 is also operable to obtain virtual camera information for each captured multi-plane image. This may include, for example, for each virtual camera, the extrinsics (e.g. pose) and intrinsics (e.g. focal length). In this way, for each multi-plane image, the extrinsics and intrinsics of the corresponding virtual camera is known.

As mentioned previously, at least some of the image planes of at least some of the multi-plane images may comprise colour images. For example, RGB or YUV images. In such examples, each colour image corresponds to a two-dimensional projection of a respective portion of the scene within a corresponding respective depth segment. That is, each colour image corresponds to a different respective depth segment of the frustum of the virtual camera that captured the corresponding multi-plane image.

In alternative or additional examples, at least some of the image planes of at least some of the multi-plane images comprise point cloud data. Each image plane may comprise point cloud data for a different respective depth segment of the frustum of the virtual camera that captured the corresponding multi-plane image. In some examples, these image planes may correspond to e.g. RGB-D images split by depth range. That is, each image plane may comprise colour and depth information (in some cases, as separate images) for a respective depth segment.

The clipping processor 1503 is operable to determine, for each multi-plane image, whether a frontmost clipping plane in a respective clipping plane pair defined for that multi-plane image intersects an object within the 3D representation of the virtual scene. A clipping plane in a respective pair is said to be frontmost if it is located closer to the virtual camera than the other clipping plane in the pair.

In some embodiments, the clipping processor 1503 comprises a number of sub-components. An example of such an embodiment is shown schematically in FIG. 15.

In FIG. 15, the first of these sub-components is a ray-casting unit 1506 configured to cast, for each virtual camera, a plurality of rays into the 3D representation of the virtual scene. The rays are cast, for each camera, from a corresponding origin of that virtual camera. The ray-casting unit 1506 is configured to determine, for each virtual camera, whether at least one of the rays cast for that virtual camera is inside or outside of the virtual object. This ray-casting process was described previously in relation to FIG. 8.

In FIG. 15, the clipping processor 1503 also comprises a clipping plane unit 1507 operable to obtain, for each virtual camera, the respective locations of the clipping planes defined for that virtual camera relative to the 3D representation of the virtual scene. As described previously, the intrinsics and extrinsics of the camera may be used to determine the camera frustum (corresponding to a volume in the virtual scene) and so the clipping plane locations can be determined from this (since they will lie within this volume). In some examples, the sub-division of the frustum may be uniform and so can be calculated by simply dividing up the frustum in the appropriate manner.

In FIG. 15, the clipping processor 1503 also comprises an intersection unit 1508 configured to determine, for each virtual camera, whether a frontmost clipping plane of a respective clipping plane pair defined for that virtual camera coincides with a location at which at least one of the rays cast for that camera is determined as being located inside the virtual object. Generally, the locations of the clipping planes relative to the virtual camera is known and so it can be determined whether a given clipping plane is 'frontmost'. Generally, the actions performed by the above described sub-components corresponds to those described previously in relation to FIG. 8 (and step 504 in FIG. 5).

As mentioned above, the system 1500 also comprises a capping processor 1504 1503 configured to receive an input from the clipping processor 1503, and in dependence thereon, identify image data (e.g. 2D pixels or 3D points) in a respective image plane that corresponds to the intersected object. This may involve, determining, for each virtual camera, which of the image planes correspond to image planes for which a frontmost clipping pane in a respective pair (defined for that multi-plane image) intersects an object in the virtual scene. For each identified image plane, it may then be determined which of the pixels or points in that image plane correspond to the object(s) intersected by the corresponding frontmost clipping plane.

Having identified the image data in the image planes corresponding to object(s) intersected by a corresponding respective frontmost clipping plane, the capping processor 1504 1503 may assign an identifier to this image data. That is, for each image plane for which at least some of the pixels or points are identified as corresponding to a 'clipped' object, an identifier may be assigned to those pixels or points. The assignation of an identifier to the image data of an image plane in this way results in a modified version of the corresponding multi-plane image. In this way, for each image plane for which image data has been assigned an identifier, a corresponding respective modified multi-plane image is generated.

As also mentioned above, the system 1500 comprises rendering processor 1505 1504. The rendering processor 1505 is configured to obtain target camera information for a target virtual camera. As described previously, this target camera information may include the pose of the target camera. In some examples, the target camera information may include the extrinsics and intrinsics of the target virtual camera.

The rendering processor 1505 is configured to render an output image of the scene from the viewpoint of the target virtual camera (i.e. the target viewpoint). The rendering processor 1505 is configured to render the output image by blending the modified multi-plane image(s) with at least some of the captured multi-plane images in accordance with the obtained virtual camera information and target camera information. As will be appreciated, in some examples, depending on the layout of the virtual scene, it may be that a majority if not all of the multi-plane images are modified (as above) and so the output image may be generated by blending these modified multi-plane images together. Generally, there is no requirement that a given number of multi-plane images be modified; however, it is generally expected that at least one of the multi-plane images will be and that this at least one modified multi-plane image will contribute to the final output image.

As mentioned previously, in some examples, there may be a prior step of selecting a subset of multi-plane images from a larger pool of candidate multi-plane images for combining, with multi-plane images corresponding more closely in viewpoint to that of the target camera being selected preferentially over those that are less similar to the target viewpoint. In such a case, at least one of the multi-plane images in the selected subset is expected to be modified in accordance with the above-described method (and system 1500). In some examples, the rendering processor 1505 is configured to generate a two-dimensional colour image of the virtual scene from the viewpoint of the target camera. In such examples, the rendering processor 1505 may be configured to determine whether any of the colour pixels in the output image correspond to the image data assigned an identifier. As described previously, even after having combined individual image planes together so as to form a composite image, and even after having combined multiple composite images together, it may still be that colour pixels corresponding to pixels or points assigned an identifier are visible in the final output image. The rendering processor 1505 may therefore be configured to modify colour pixels determined as corresponding to image data assigned an identifier. The modification may involve modifying the colour of these pixels in dependence on at least some of the other colour pixels (i.e. not assigned an identifier). For example, a morphological dilation operation may be performed so as to fill-in any 'clipped' or 'capped' pixels with colour information from the surrounding pixels.

In some embodiments, the rendering processor 1505 is configured to generate, for each multi-plane image, a corresponding respective composite image. The rendering processor 1505 may be configured to generate each composite image by re-projecting the image data in each of the individual image planes in the corresponding multi-plane image, with the re-projection being dependent on the difference in pose between the target virtual camera and the virtual camera that captured the corresponding multi-plane image. As mentioned previously, this may correspond to applying a homographic transformation to the image data in the image planes so as transform the image data from the corresponding virtual camera pose to the target camera pose. For each multi-plane image, the corresponding image planes comprising re-projected image data may be combined to form the corresponding composite image. This may be repeated for each multi-plane image so as to generate a plurality of composite images (i.e. one for each multi-plane image).

The rendering processor 1505 may then blend the composite images together so as generate the output of image of the virtual scene from the target viewpoint. As will be appreciated, the number of composite images generated and subsequently combined may be dependent on a pre-selection step, with only composite images being generated and combined for virtual cameras having sufficiently similar viewpoints to the target viewpoint.

In some examples, the rendering processor 1505 may be configured to determine a weighting for each of the composite images that are to be combined. The weighting may be higher for composite images corresponding more closely in viewpoint with the target viewpoint (which may be determined from the obtained target and virtual camera information). The rendering processor 1505 may be configured to blend the composite images together in accordance with the associated weightings, e.g. via a blending equation (described previously in relation to FIG. 1).

In some embodiments, the system 1500 may further comprise an input device 1509 operable to generate a user input signal responsive to an input received at or via the input device. The input device 1509 may correspond to one or more of: a hand-holdable control device (e.g. games controller, motion controller, etc.), head-mountable display, camera device, portable video gaming device, touchscreen device, etc. Generally, the input device 1509 may be used by a player of a video game to control their position and/or orientation within a virtual world of a video game. For example, by moving their head whilst wearing an HMD, moving a thumbstick on a games controller, performing a swipe motion on a touchscreen device, etc. It will be appreciated that methods of generating/tracking user inputs at input devices are generally known and need not be explored in detail in the present disclosure. In any case, the user input signal generated at or via the input device 1509 may define the pose of the target virtual camera. In FIG. 15, the user input generated at the input device 1509 is shown as being provided as an input to the rendering processor 1505. The rendering processor 1505 may thus use the target camera information generated as part of the user input signal when rendering the final output image.

Figure 16:
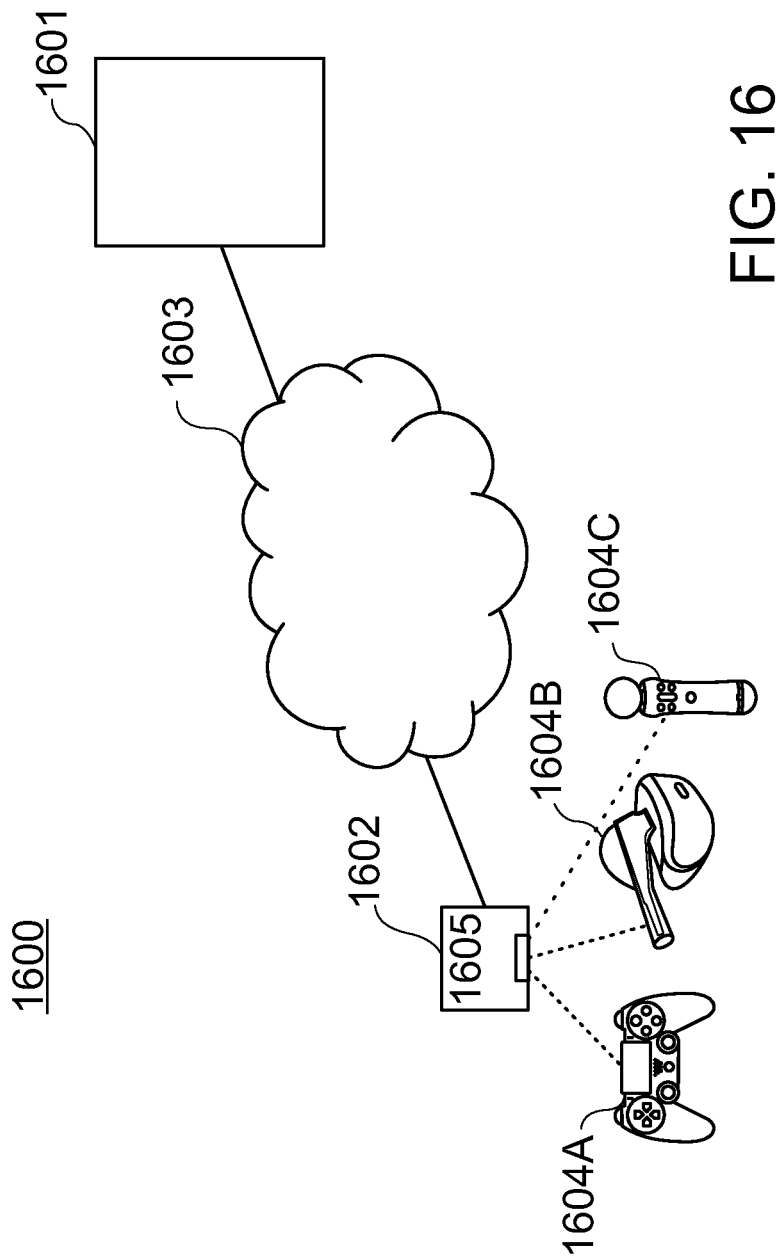
FIG. 16 shows schematically an example of a cloud gaming system that may be used in accordance with the system shown in FIG. 15.

FIG. 16 shows schematically an example of a cloud gaming system 1600 that may be used in accordance with the present disclosure. In FIG. 16, the cloud gaming system 1600 is shown as comprising a server 1601 that is in communication with a client device 1602 via a communications network 1603. The server 1601 may be configured to perform at least some of the rendering described above (i.e. in accordance with the present disclosure).

The client device 1602 may include, e.g. a video game playing device (games console), a smart TV, a set-top box, a smartphone, laptop, personal computer (PC), USB-streaming device (e.g. Chromecast), etc. The client device 1602 may receive e.g. video frames from the server 1601, via the communications network 1603. In some examples, the client device 1601 may receive image data from the server 1691 and perform further processing on that image data.

In FIG. 16, the client device 1602 is shown as being associated with a plurality of input devices 1604A (DualShock 4®), 1604B (PS VR® headset), 1604C (PS Move® Controller). It will be appreciated that the input devices 1604A, 1604B, 1604C shown are merely illustrative examples and that a different number of, and/or different types of input devices may be provided. The input devices are in communication with the client device via a wired or wireless connection. In FIG. 16, the client device 1602 is shown as comprising a communication interface 1605 for receiving user inputs generated at or via the input devices. It will be further appreciated that in some examples, user inputs may be generated at the client device 1602 and not necessarily with a separate, standalone input device. For example, if the client device 1602 is e.g. a smartphone or table with a touchscreen.

In some examples, the server 1601 may comprise the virtual scene unit 1501, multi-plane imaging unit 1502, clipping processor 1503, capping processor 1504 and rendering processor 1505 described previously. In such examples, the client device 1602 may simply receive the final output images from the server 1602.

In alternative examples, the server 1602 may comprise all of the components of the system described previously in relation to FIG. 15, bar the rendering processor 1505. In these embodiments, the client device 1602 may be configured to receive the multi-plane images from the server 1601 and perform said compositing and subsequent blending so as to generate the final image. This may be beneficial, for example, where the server 1601 needs only send a few updated image planes in order to render an image of the virtual scene from the target viewpoint. The client device 1602 can thus receive these updated image planes, generate the corresponding composite images and blend these with the existing valid image planes (and corresponding MPIs). Any correction of the final image may be performed at the client device using e.g. morphological dilation and/or an appropriately trained machine learning model.

It is noted that the term "based on" is used throughout the present disclosure. The skilled person will appreciate that this term can imply "in dependence upon", "in response to" and the like, such that data A being based on data B indicates that a change in data B will lead to a resulting change in data A. Data B may be an input to a function that calculates data A based on data B, for example.

In some embodiments, there is provided computer software which, when executed by one or more computers, causes the one or more computers to perform the previously described methods. This computer software may be stored at a non-transitory machine-readable storage medium.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. A method of generating an image of a scene from a target viewpoint, the method comprising:
    obtaining a three-dimensional (3D) representation of a virtual scene comprising at least one object;
    capturing a plurality of multi-plane images of the 3D representation of the virtual scene, each multi-plane image corresponding to a different respective viewpoint of the 3D representation of the virtual scene;
    wherein each multi-plane image comprises a plurality of image planes, each image plane comprising image data for a different respective successive depth segment of the virtual scene;
    wherein each depth segment is defined by a pair of corresponding clipping planes that sub-divides a frustum of a virtual camera that captured-captures the corresponding multi-plane image;
    obtaining virtual camera information associated with each of the captured multi-plane images;
    determining, for each multi-plane image, whether at least one clipping plane in a respective clipping plane pair defined for that multi-plane image intersects an interior of an object within the 3D representation of the virtual scene;
    responsive to a positive determination for at least one of the multi-plane images,
    identifying image data in the corresponding image plane that corresponds with the intersected interior of the object and assigning an identifier to the image data to thereby obtain at least one respective modified multi-plane image;
    obtaining camera information for a target virtual camera; and
    generating an output image of the scene from a viewpoint of the target virtual camera by combining at least some of the multi-plane images together, at least one of the multi-plane images comprising a modified multi-plane image, said combination being performed in dependence on the obtained virtual camera information and target virtual camera information.

2. The method according to claim 1, wherein at least one of the image planes corresponds to a color image of a portion of the virtual scene within the corresponding depth segment, the image data for the color image comprising color pixels.

3. The method according to claim 1, wherein at least one of the image planes corresponds to a respective point cloud, the image data for the point cloud corresponding to color and depth information for points within the corresponding depth segment of the virtual scene.

4. The method according to claim 2, wherein the output image comprises an output color image, the output color image comprising a plurality of color pixels.

5. The method according to claim 4, comprising:
determining whether any of the color pixels in the output color image correspond to the image data assigned the identifier in the at least one modified multi-plane image;
responsive to a positive determination for at least some of the color pixels in the output color image, identifying corresponding pixels in the output color image; and
modifying the identified pixels in the output color image by modifying a color associated with the identified pixels, said modification being performed in dependence on the color of other pixels in the output color image.

6. The method according to claim 1, wherein determining for each multi-plane image, whether at least the clipping plane in a respective clipping plane pair defined for that multi-plane image intersects the interior of the object, comprises:
casting a plurality of rays into the 3D representation of the virtual scene, the rays being cast from an origin defined by the corresponding virtual camera;
obtaining locations of the clipping planes defined for the corresponding virtual camera relative to the 3D representation of the virtual scene;
determining, for each obtained clipping plane location, whether at least one of the cast rays is located inside or outside of the object; and
wherein a positive determination for a respective clipping plane pair corresponds to a determination that the location of the clipping plane in that pair coincides with a location at which at least one of the cast rays is determined as being located inside the object.

7. The method according to claim 1, wherein the identifier comprises an object material identifier, the object material identifier being stored in an object ID channel associated with the corresponding image plane.

8. The method according to claim 1, wherein assigning the identifier to the identified image data in the image plane comprises replacing or modifying the image data so as to cap the intersected interior of the object.

9. The method according to claim 8, wherein at least some of the objects in the virtual scene comprise volumes in which at least one other object is contained; and
wherein capping the intersected interior of the object acts so as to conceal any other objects located within that object from view in the output image.

10. The method according to claim 1, wherein the obtained virtual camera information comprises virtual camera pose information associated with each captured multi-plane image; and
wherein the camera information obtained for the target virtual camera comprises a pose of the target virtual camera.

11. The method according to claim 10, wherein generating the output image comprises: generating a plurality of composite images, each composite image corresponding to a different respective one of the at least some multi-plane images;
wherein each composite image is generated by re-projecting the image data in each individual image plane in the corresponding multi-plane image, the re-projection being dependent on the difference in pose between the target virtual camera and the virtual camera that captured the corresponding multi-plane image; and
blending the composite images together so as to generate the output image of the virtual scene from the viewpoint of the target virtual camera.

12. The method according to claim 11, wherein blending the composite images together comprises blending the composite images together in dependence on the difference in pose between the target virtual camera and the virtual camera poses associated with the at least some multi-plane images.

13. The method according to claim 1, wherein the 3D representation of the virtual scene corresponds to a virtual scene rendered by a video game processor; and
wherein an obtained pose of the target virtual camera corresponds to a player's view of the virtual scene, the pose of the target virtual camera being determined in dependence on a user input generated at an input device and received at the video game processor.

14. The method according to claim 13, comprising performing said method at a server, the server being in communication with a client device via a communications network;
the method further comprising:
transmitting the respective rendering of the virtual scene from the target viewpoint to the client device, via the communications network.

15. A non-transitory machine-readable storage medium storing processor-executable instructions, wherein the processor-executable instructions, when executed by a processor, cause the processor to carry out the method claimed in claim 1.

16. A system for generating an image of a virtual scene from a target viewpoint, the system comprising:
a virtual scene unit operable to obtain a three-dimensional representation of a virtual scene comprising at least one virtual object;
a multi-plane imaging unit operable to capture a plurality of multi-plane images of the three-dimensional representation of the virtual scene, each multi-plane image corresponding to a different respective viewpoint of the virtual scene captured by a virtual camera;
the multi-plane imaging unit being operable to obtain virtual camera information for each captured multi-plane image;
a clipping processor operable to determine, for each multi-plane image, whether a frontmost clipping plane in a respective clipping plane pair defined for that multi-plane image intersects an object within the three-dimensional representation of the virtual scene;
a capping processor configured to receive an input from the clipping processor, and responsive thereto, identify image data in a respective corresponding image plane corresponding to the intersected object;
the capping processor being configured to assign an identifier to the image data identified as corresponding to the intersected object so as to modify the corresponding multi-plane image;
a rendering processor operable to obtain target virtual camera information for a target virtual camera and to render an output image of the virtual scene from a viewpoint of the target virtual camera,
the rendering processor being configured to generate the output image by blending the modified multi-plane image with at least some of the captured multi-plane images in accordance with the obtained virtual camera information and target camera information.

17. The system according to claim 16, wherein at least some of image planes of at least some of the multi-plane images comprise color images, each color image corresponding to a different respective depth segment of a frustum of the virtual camera that captures the corresponding multi-plane image.

18. The system according to claim 16, wherein at least some of image planes of at least some of the multi-plane images comprise point cloud data, each image plane comprising point cloud data for a different respective depth segment of a frustum of the virtual camera that captures the corresponding multi-plane image.

19. The system according to claim 16, wherein the clipping processor comprises:
a ray-casting unit configured to cast, for each virtual camera, a plurality of rays into the three-dimensional representation of the virtual scene, the rays being cast from a respective origin of the virtual camera;
the ray-casting unit being configured to determine, for each virtual camera, whether at least one of the rays cast for that virtual camera is inside or outside of the virtual object;
a clipping plane unit operable to obtain, for each virtual camera, locations of clipping planes defined for that virtual camera relative to the three-dimensional representation of the virtual scene; and
an intersection unit configured to determine, for each virtual camera, whether a frontmost clipping plane of a respective clipping plane pair defined for that virtual camera coincides with a location at which at least one of the cast rays is determined as being located inside the virtual object.

20. The system according to claim 16, wherein the rendering processor is configured to generate a two-dimensional color image of the virtual scene from the viewpoint of the target virtual camera.

21. The system according to claim 20, wherein the rendering processor is configured to determine whether any color pixels in the output image correspond to the image data assigned the identifier; and
wherein the rendering processor is configured to modify color pixels determined as corresponding to the image data assigned the identifier, said modification comprising modifying said pixels in dependence on at least some of the other color pixels in the output image.

22. The system according to claim 16, wherein the multi-plane imaging unit is operable to obtain a pose of each virtual camera; and
wherein the rendering processor is operable to obtain a pose of the target virtual camera.

23. The system according to claim 22, wherein the rendering processor is configured to generate, for each multi-plane image, a corresponding respective composite image;
wherein the rendering processor is configured to generate each composite image by re-projecting the image data in each individual image plane in the corresponding multi-plane image, the re-projection being dependent on a difference in pose between the target virtual camera and the virtual camera that captured-captures the corresponding multi-plane image; and
wherein the rendering processor is configured to blend the composite images together so as to generate the output image of the virtual scene from the viewpoint of the target virtual camera.

24. The system according to claim 23, wherein the rendering processor is further configured to determine a weighting for each of the composite images that are to be combined, the weighting being higher for composite images corresponding more closely in viewpoint with the target viewpoint; and
wherein the rendering processor is configured to blend the composite images together in accordance with the associated determined weightings.

25. The system according to claim 16, comprising:
an input device operable to generate a user input signal responsive to an input received at or via the input device, the user input signal defining a pose of the target virtual camera; and
wherein the rendering processor is operable to receive the user input signal and thereby obtain the target virtual camera information.

* * * * *

UNITED STATES PATENT AND TRADEMARK OFFICE
CERTIFICATE OF CORRECTION

PATENT NO. : 12,347,022 B2
APPLICATION NO. : 18/017793
DATED : July 1, 2025
INVENTOR(S) : Andrew James Bigos Page 1 of 1

It is certified that error appears in the above-identified patent and that said Letters Patent is hereby corrected as shown below:

In the Claims

Column 22, Line 30, in Claim 1, delete "captured-captures" and insert -- captures --.

Column 24, Line 55, in Claim 16, after "image;" insert -- and --.

Column 24, Line 66, in Claim 17, before "image" delete "of".

Column 25, Line 5, in Claim 18, before "image" delete "of".

Column 26, Line 17, in Claim 23, delete "captured-captures" and insert -- captures --.

Signed and Sealed this
Twelfth Day of August, 2025

Coke Morgan Stewart
*Acting Director of the United States Patent and Trademark Office*